United States Patent [19]
Abe et al.

[11] Patent Number: 5,845,394
[45] Date of Patent: Dec. 8, 1998

[54] METHOD OF MANUFACTURING A YOKE FOR AN ELASTIC UNIVERSAL JOINT

[75] Inventors: Shouichi Abe, Gunma-ken; Kiyoshi Okubo, Maebashi, both of Japan

[73] Assignee: NSK Ltd., Tokyo, Japan

[21] Appl. No.: 662,527

[22] Filed: Jun. 13, 1996

[30] Foreign Application Priority Data

Jun. 29, 1995 [JP] Japan .................................. 7-163505

[51] Int. Cl.⁶ .................................................. B23P 13/04
[52] U.S. Cl. ...................... 29/897.2; 29/557; 29/DIG. 11; 72/348; 72/379.2; 402/58
[58] Field of Search .................... 29/557, 897.2, 29/DIG. 11; 72/379.2, 368, 348; 403/57, 58, 74, 398

[56] References Cited

U.S. PATENT DOCUMENTS

| | | | |
|---|---|---|---|
| 4,646,552 | 3/1987 | Kanbe | 72/379.2 |
| 5,601,337 | 2/1997 | Ohya | 29/557 |

FOREIGN PATENT DOCUMENTS

| | | | |
|---|---|---|---|
| 0 100 163 | 2/1984 | European Pat. Off. . | |
| 2502528 | 10/1982 | France | 29/557 |
| 2 614 985 | 11/1988 | France . | |
| 54-82257 | 6/1979 | Japan . | |
| 56-39325 | 4/1981 | Japan . | |
| 0195544 | 12/1982 | Japan | 72/379.2 |
| 61-201926 | 9/1986 | Japan . | |
| 5-83462 | 11/1993 | Japan . | |
| 5-89964 | 12/1993 | Japan . | |
| 6-6757 | 1/1994 | Japan . | |
| 6-280889 | 10/1994 | Japan . | |
| 6-337020 | 12/1994 | Japan . | |
| 1559186 | 1/1980 | United Kingdom . | |

*Primary Examiner*—David P. Bryant
*Attorney, Agent, or Firm*—Shapiro and Shapiro

[57] ABSTRACT

In manufacturing a yoke for an elastic universal joint, the time required for each step is shortened and the automation of each step is made easy, and by the energy saving and high efficiency of the manufacturing work, a reduction in the cost is achieved. A metallic plate is subjected to working which can be done easily and within a short time by press work such as stamping work, deep drawing work and ironing work, to thereby make a yoke for an elastic universal joint. This can be accomplished because welding work and cutting work which require much working time and which are cumbersome to automate can be eliminated. Investment in facilities may be small.

9 Claims, 33 Drawing Sheets

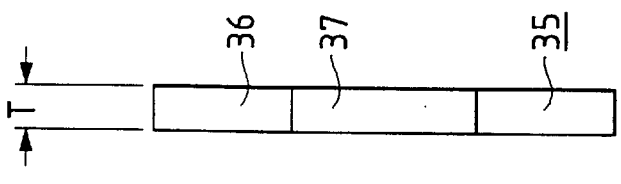
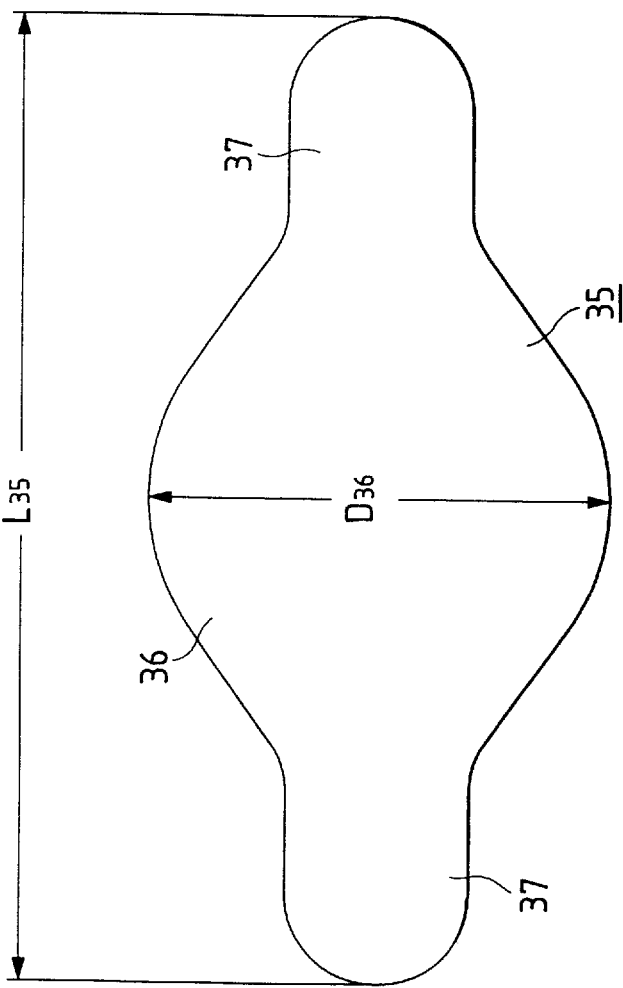

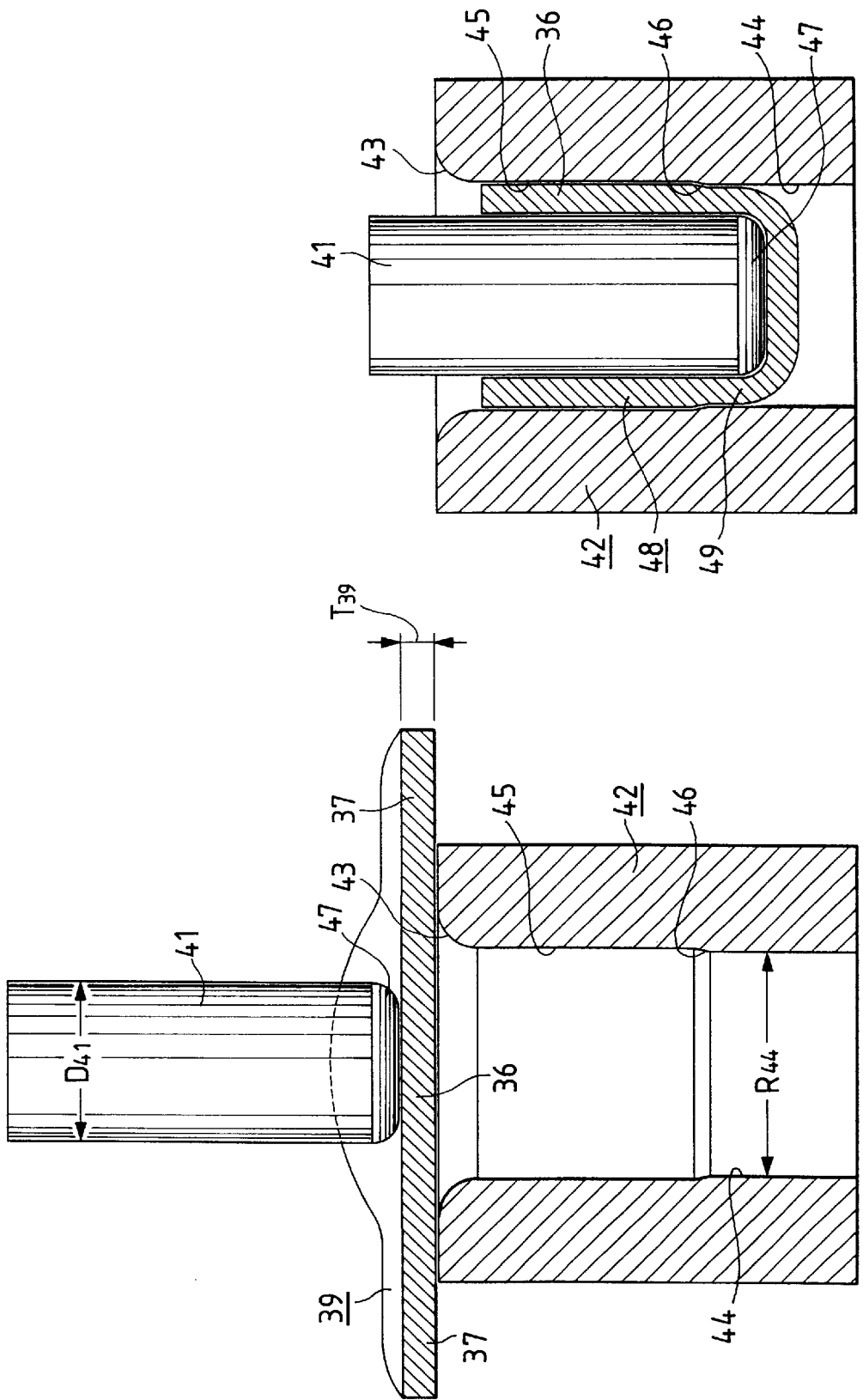

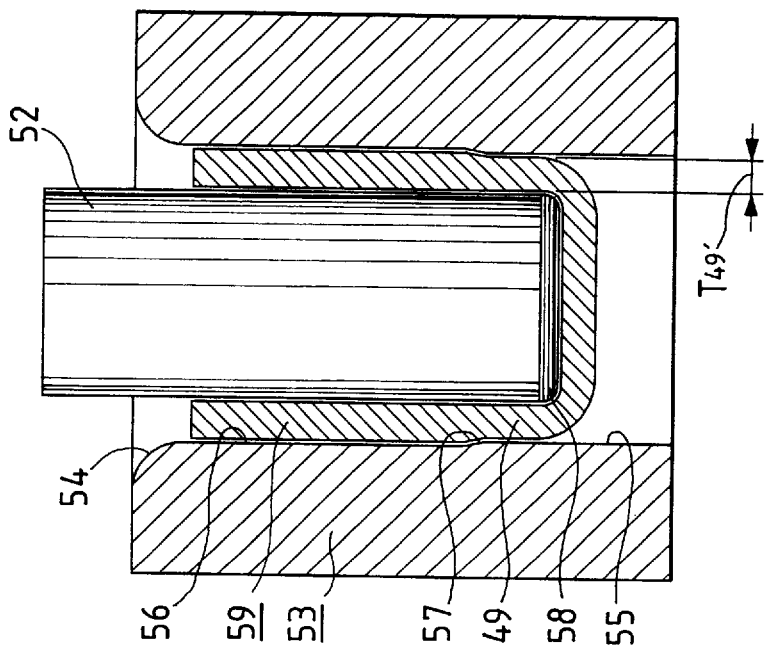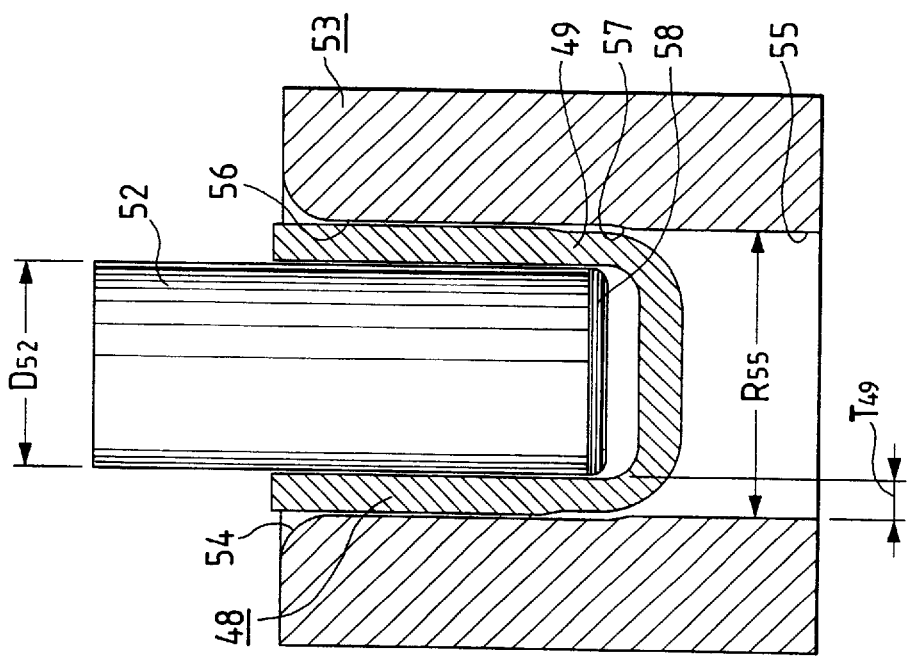

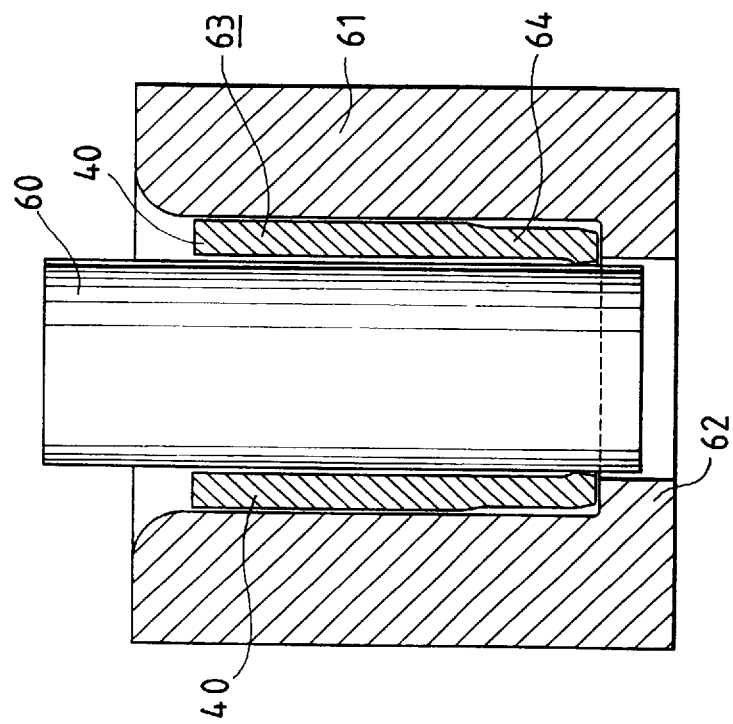
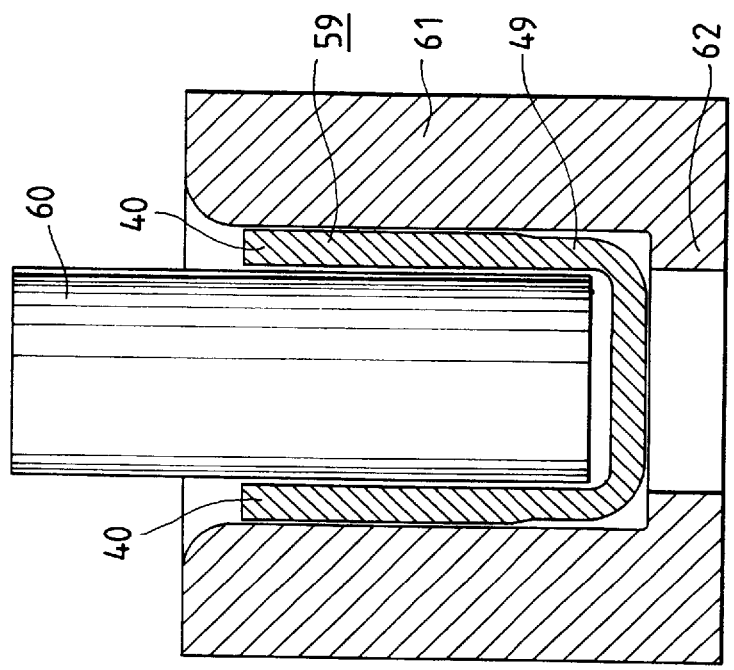
FIG. 9A
FIG. 9B

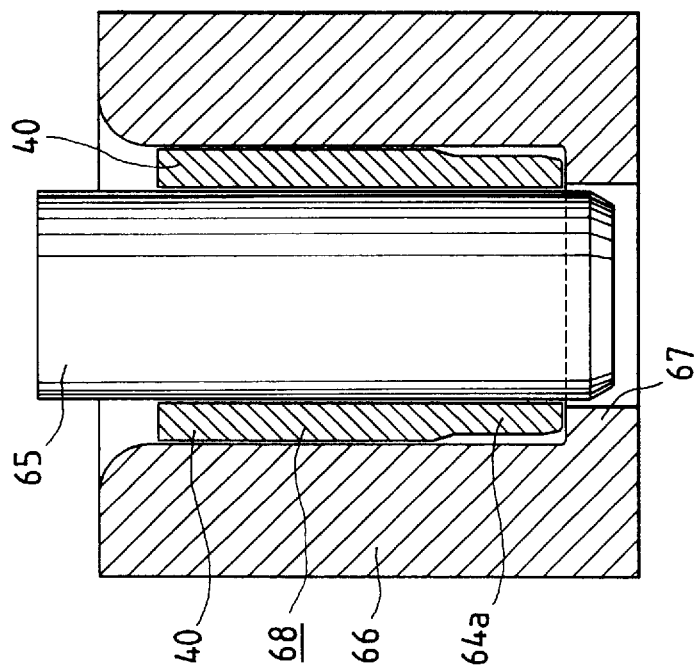
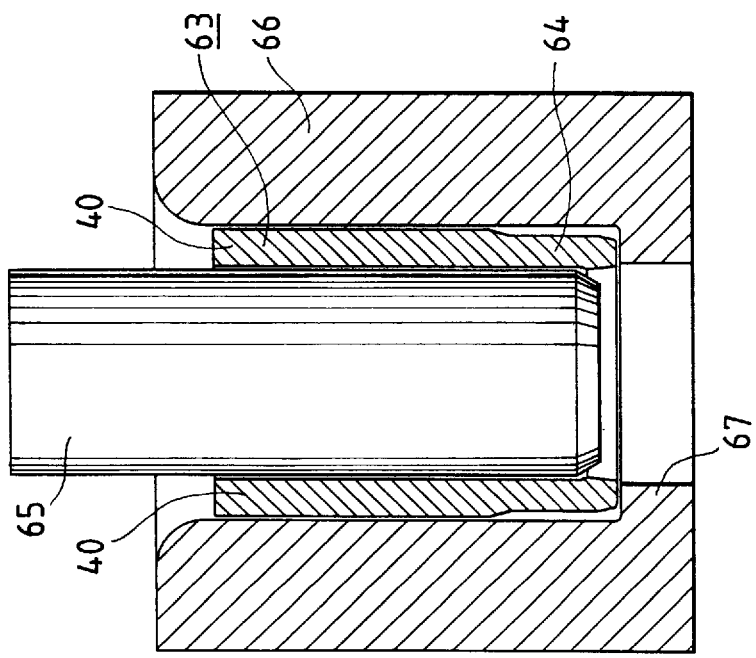
FIG. 11A
FIG. 11B

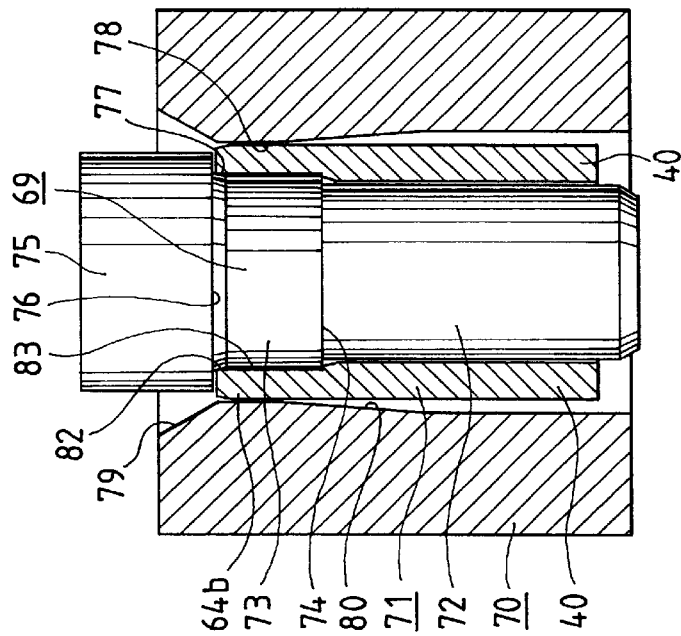
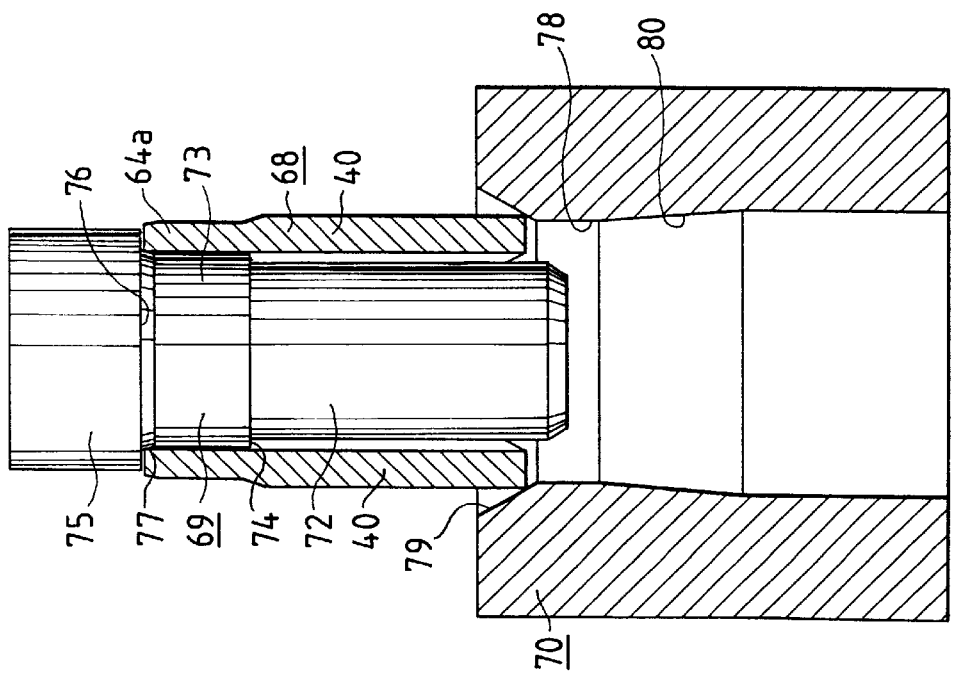

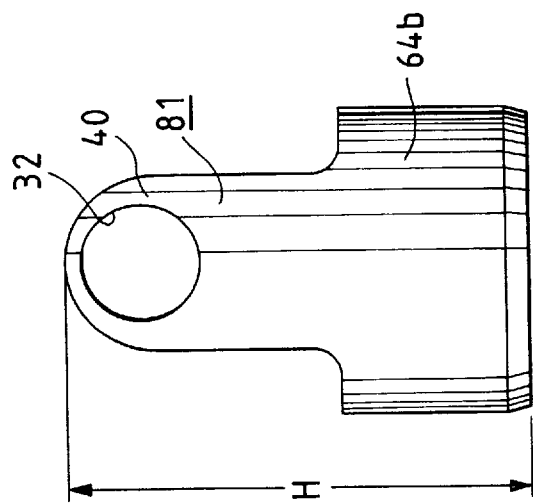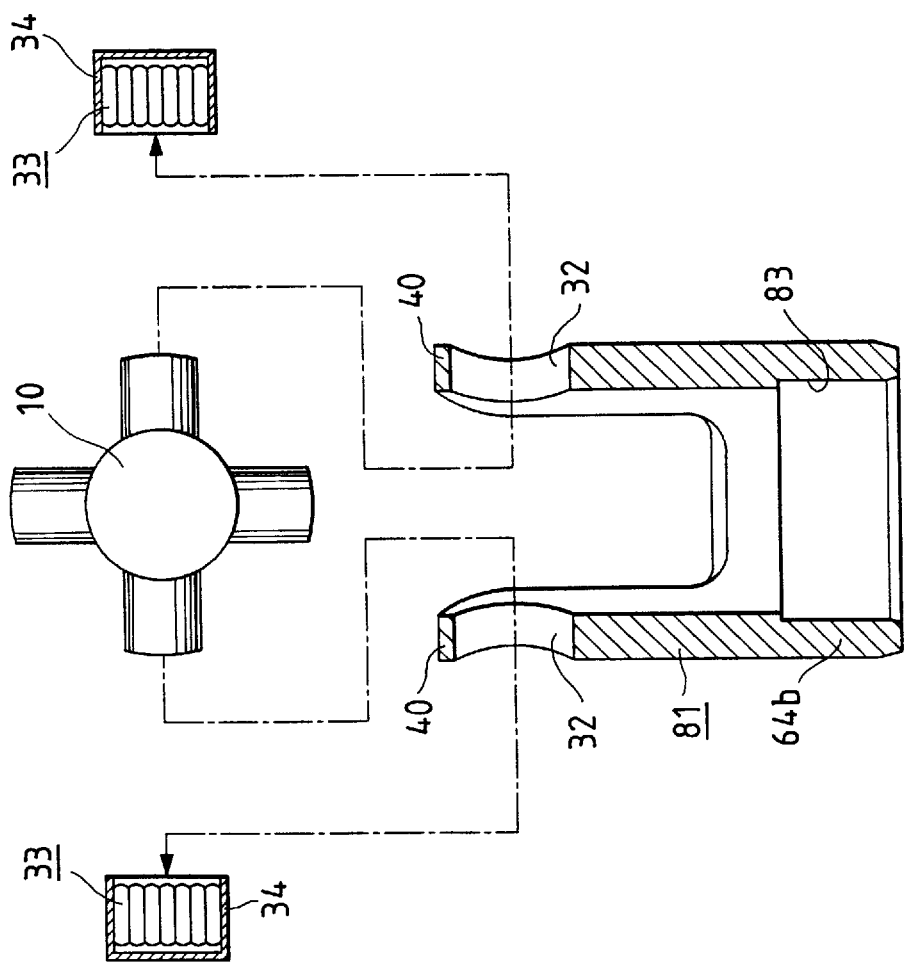

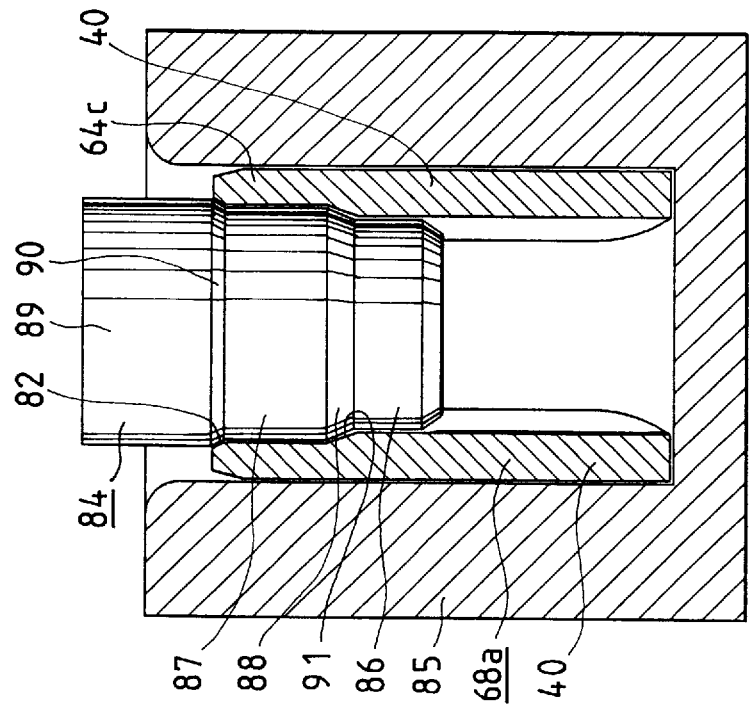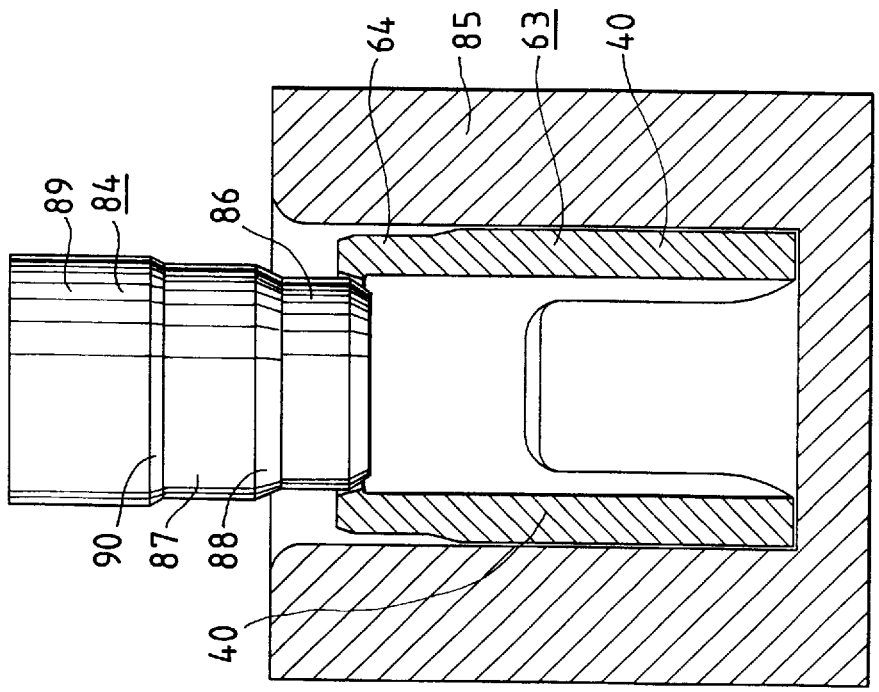

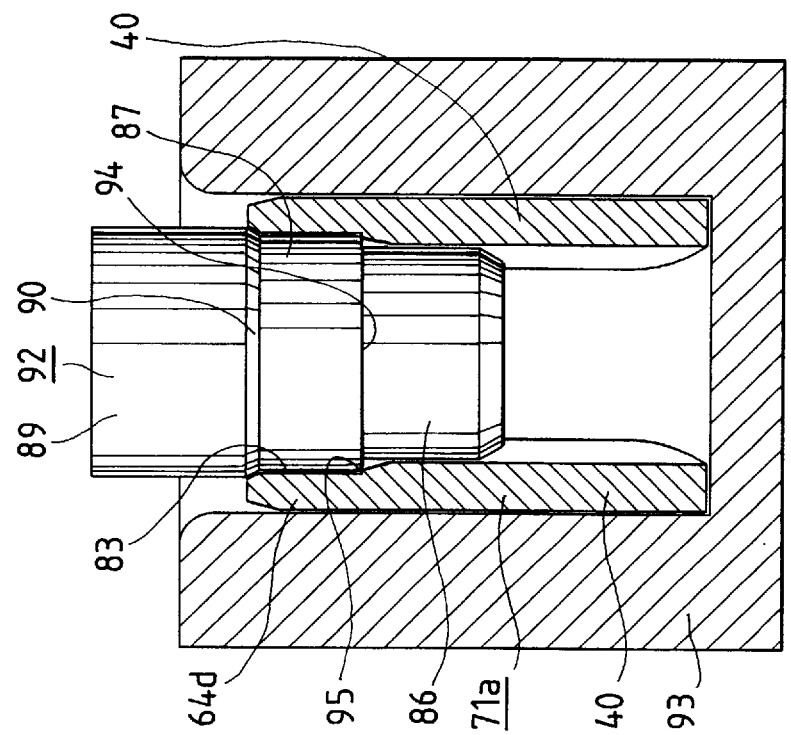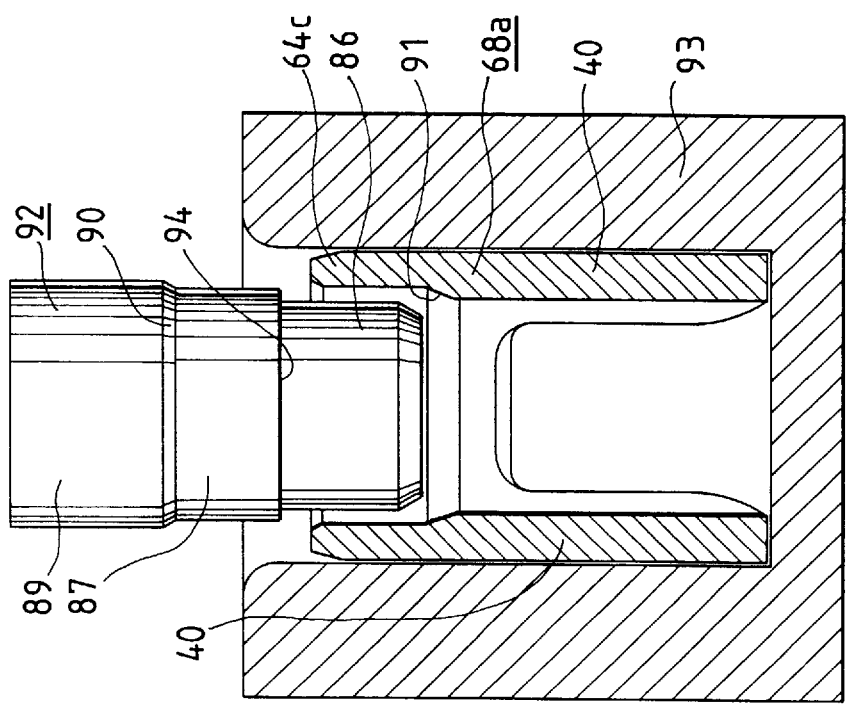

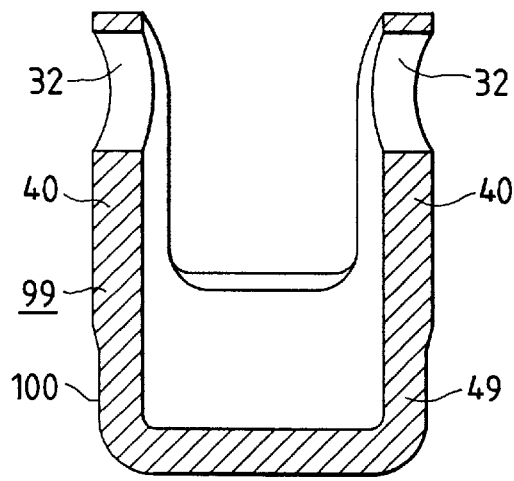
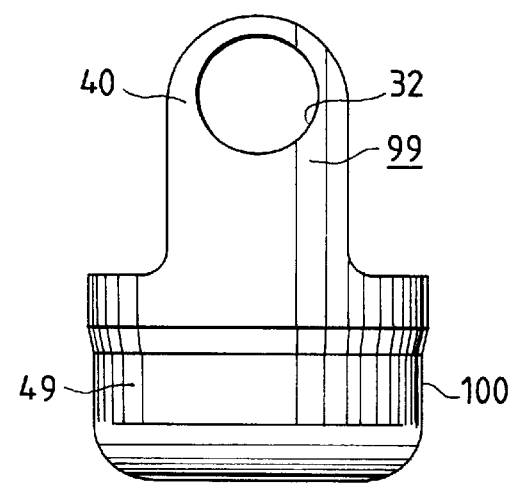
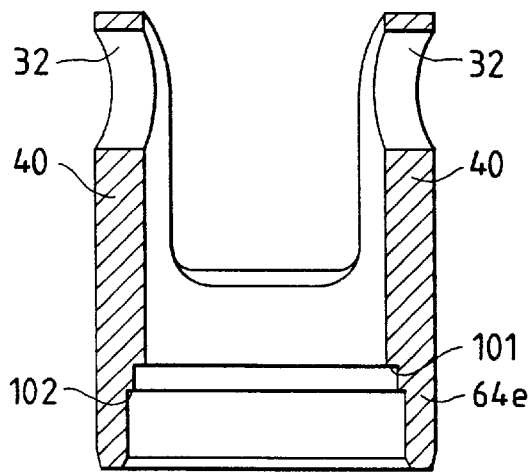
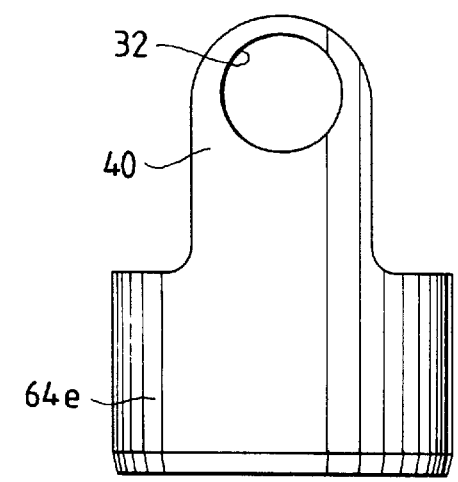

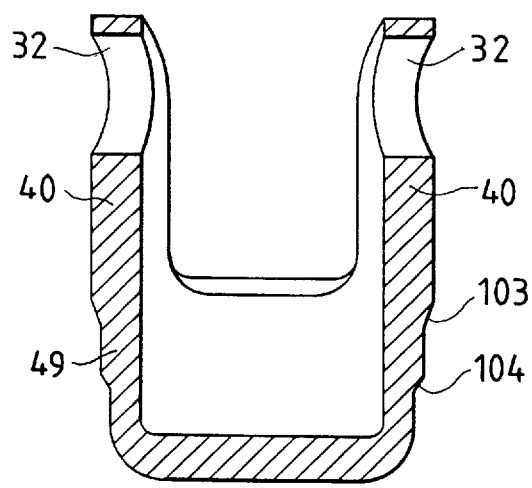 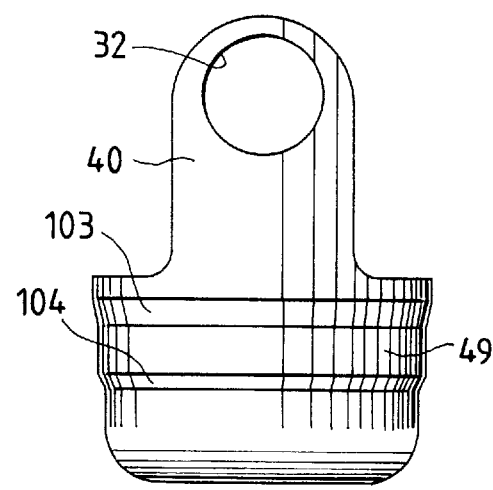

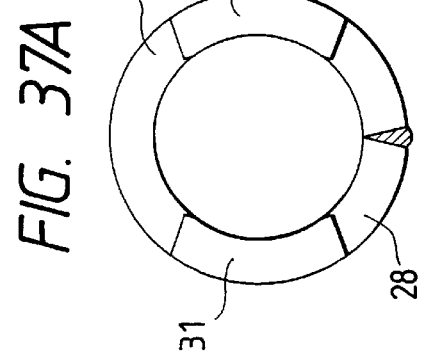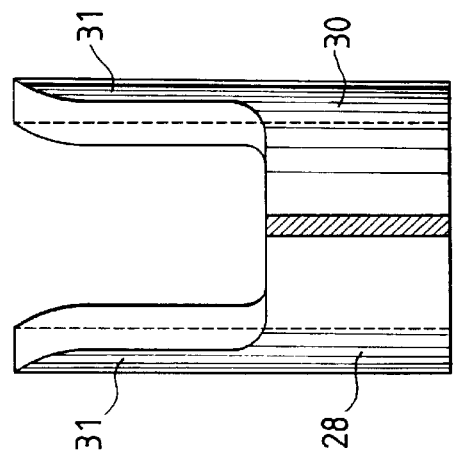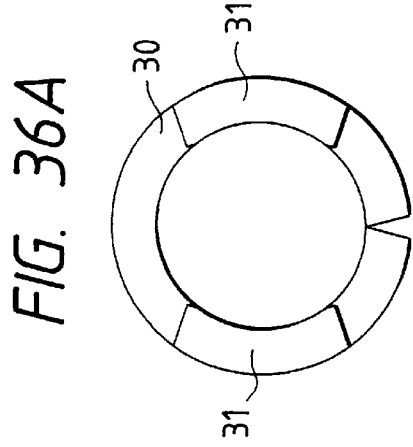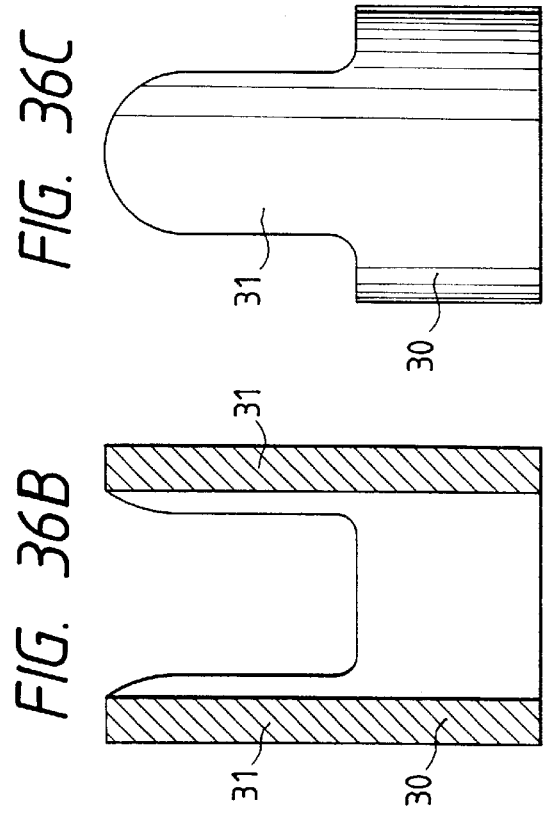

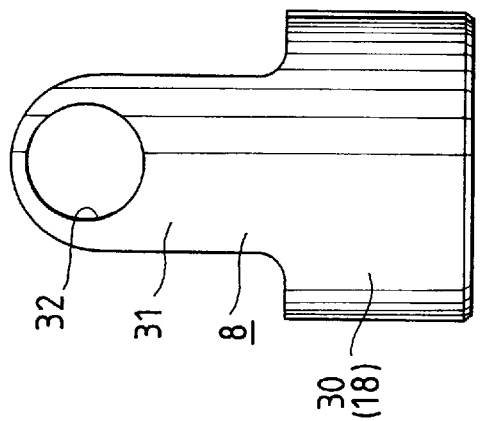
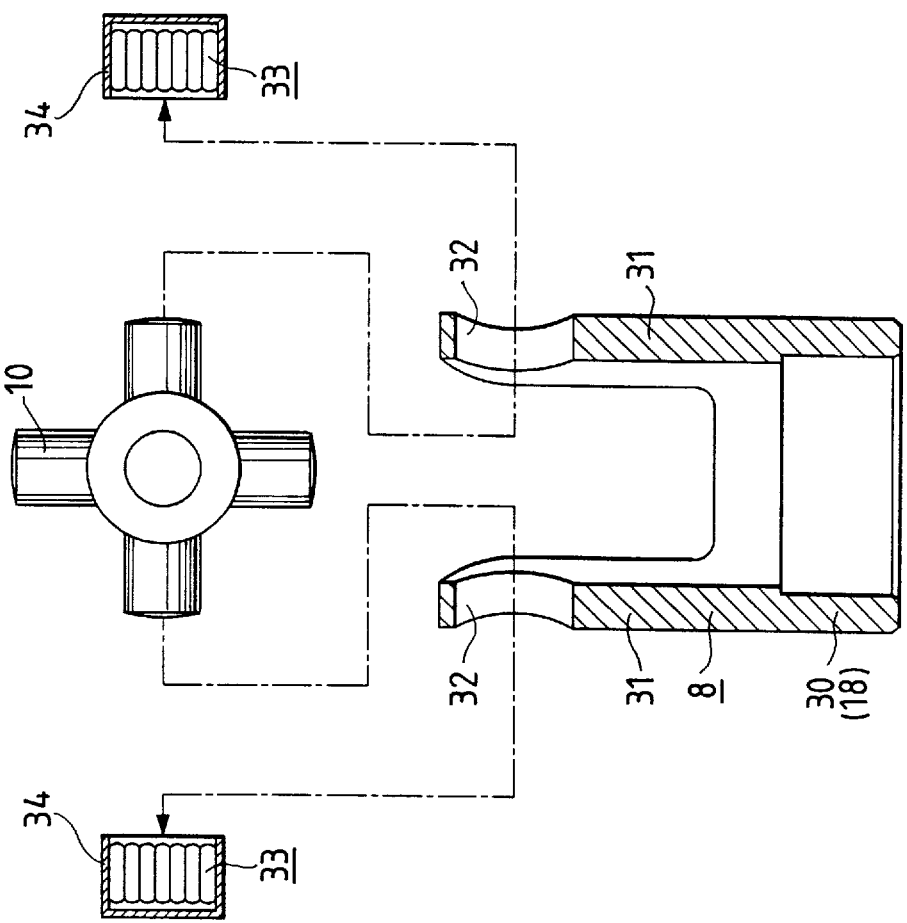

METHOD OF MANUFACTURING A YOKE FOR AN ELASTIC UNIVERSAL JOINT

BACKGROUND OF THE INVENTION

1. Field of the Invention

This invention relates to a method of manufacturing a yoke for an elastic universal joint to be incorporated, for example, into the steering apparatus of an automobile.

2. Related Background Art

The steering apparatus of an automobile is constructed as shown, for example, in FIG. 30 of the accompanying drawings. The movement of a steering wheel is transmitted to a steering gear through a steering shaft and a connecting shaft and wheels are steered by the steering gear 4. It is often the case that the steering shaft 2 and the input shaft of the steering gear 4 cannot be provided on one and the same straight line. Therefore, it has heretofore been practised to provide the connecting shaft 3 between the shafts 2 and 5 and to couple the opposite end portions of the connecting shaft 3 and the end portions of the steering shaft 2 and the input shaft 5 together through universal joints 6, 6 so that power transmission between the steering shaft 2 and the input shaft 5 which are not on one and the same straight line can be effected. It has also heretofore been practised to provide one of the universal joints 6, 6 with vibration absorbing capability to prevent any vibration transmitted from wheels to the steering gear during the running of the automobile from being transmitted to the steering wheel 1 which would give an unpleasant feeling to a driver. To provide the universal joint 6 with the vibration absorbing capability, use is generally made of a so-called elastic universal joint comprising an elastic material such as rubber incorporated in the universal joint 6 to prevent the transmission of vibration by this elastic material.

As such elastic universal joints, there are known ones described in Japanese Patent Application Laid-Open No. 56-39325 (French Patent Laid-Open 2464404), Japanese Utility Model Application Laid-Open No. 54-82257, Japanese Utility Model Application Laid-Open No. 5-83462, Japanese Utility Model Application Laid-Open No. 5-89964, French Patent Laid-Open 2614985, etc. These known elastic universal joints are substantially the same in basic structure and therefore, the structure described in Japanese Utility Model Laid-Open Application No. 5-89964 will hereinafter be explained with reference to FIGS. 31 to 33 of the accompanying drawings.

This elastic universal joint 6a, as shown in FIG. 31, is comprised of a steering shaft 2, a first yoke 8 fitted on and fixed to the tip end portion (the left end portion as viewed in FIGS. 31 and 32) of the steering shaft 2 through a shock absorbing cylinder 7, a second yoke 9 and a cruciform shaft 10 connecting the second yoke 9 and the first yoke 8 together. On that end portion of the steering shaft 2 which protrudes from one end edge (the left end edge as viewed in FIG. 32) of the shock absorbing cylinder 7, there is formed a serration shaft portion 11, as shown in FIGS. 32 and 33. The central hole 13 of a transmission frame 12 is serration-engaged with the serration shaft portion 11. Accordingly, the transmission frame 12 is secured to the end portion of the steering shaft 2 and is rotated with this steering shaft 2. Projected pieces 14, 14 diametrally outwardly protruding relative the outer peripheral surface of the shock absorbing cylinder 7 are integrally formed at two diametrally opposite locations on the outer peripheral edge of the transmission frame 12. The transmission frame 12 and the steering shaft 2 can also be integrally formed as by cold forging.

Of the constituent members of the elastic universal joint 6a, the shock absorbing cylinder 7 includes an elastic material 15 such as rubber or elastomer and is formed into a cylindrical shape. That is, this shock absorbing cylinder 7 comprises an inner sleeve 16 and an outer sleeve 17 each made of metal and formed into a cylindrical shape and disposed concentrically with each other. The outer peripheral surface of the inner sleeve 16 and the inner peripheral surface of the elastic material 15 are coupled together by baking or adhesive securing, and the inner peripheral surface of the outer sleeve 17 and the outer peripheral surface of the elastic material 15 are likewise coupled together. The inner sleeve 16 is fitted on and fixed to the end portion of the steering shaft 2, and the outer sleeve 17 is fitted in and fixed to a cylinder portion 18 provided on the first yoke 8 which will now be described.

The first yoke 8 has a cylinder portion 18 and a pair of first arms 19, 19 axially extending from the diametrally opposite locations on one end edge (the left end edge as viewed in FIGS. 31 and 32 ) of the cylinder portion 18 in the axial direction thereof (the left to right direction as viewed in FIGS. 31 and 32). First circular holes 20, 20 are formed coaxially with each other in the tip end portions (the left end portions as viewed in FIGS. 31 and 32 ) of these first arms 19, 19. Cut-aways 21, 21 are formed in those portions of the cylinder portion 18 at the diametrally opposite locations on one end edge in the axial direction thereof which are off the pair of first arms 19, 19. The width W of each of these cut-aways 21, 21 is greater than the width w of each of the projected pieces 14, 14 of the transmission frame 12 (W>w). With the steering shaft 2 assembled to the inner side of the first yoke 8, the projected pieces 14, 14 are loosely engaged with the inner sides of the cut-aways 21, 21 with a gap therebetween.

The second yoke 9 has a pair of second arms 22 provided in spaced apart relationship with each other, and is coupled and fixed to the end portion of the connecting shaft 3. Second circular holes 23 are formed coaxially with each other in the tip end portions of the second arms 22. The four tip end portions of the cruciform shaft 10 are rotatably supported in the first and second circular holes 20 and 23 through bearings such as radial needle bearings.

The action of the elastic universal joint 6a constructed as described above is as follows. When the automobile is running rectilinearly or when a rotational torque applied from the steering wheel to the steering shaft 2 is small, the projected pieces 14, 14 of the transmission frame 12 fixed to the tip end portion of the steering shaft 2 are present at neutral positions inside the cut-aways 21, 21 or position a little deviated from the neutral positions. In such a state, the cylinder portion 18 and the transmission frame 12 do not directly contact with each other. Also, the above-mentioned small rotational torque is transmitted from the steering shaft 2 to the first yoke 8 through the shock absorbing cylinder 7. In this case, vibration transmitted from wheels to the first yoke 8 through the steering gear, the connecting shaft 3, the second yoke 9, the cruciform shaft 10, etc. is absorbed by the elastic material 15 of the shock absorbing cylinder 7 and is not transmitted to the steering shaft 2.

In contrast, when the rotational torque applied from the steering wheel to the steering shaft 2 is great as when a great steering angle is imparted to the front wheels, outer sides of the projected pieces 14, 14 and inner sides of the cut-aways 21, 21 abut against one another. As a result, much of the rotational torque applied from the steering wheel 1 (FIG. 30) to the steering shaft 2 is transmitted to the first yoke 8 through the transmission frame 12. In this state, the rotational torque transmitted through the shock absorbing cylinder 7 is limited. Accordingly, even when the rotational torque transmitted through the elastic universal joint 6a has become great, it never happens that an unreasonable force acts on the elastic material 15 of the shock absorbing cylinder 7, whereby this elastic material 15 is damaged.

As an elastic universal joint, there is also known one of such structure as shown in FIG. 34 of the accompanying drawings. In the case of this elastic universal joint 6b of the conventional structure, a pin 24 is supported on and fixed to the tip end portion of the steering shaft 2 in the diametral direction thereof. In those portions of the shock absorbing cylinder 7 with which the opposite end portions of the pin 24 are aligned, there are formed circular holes 25, 25 each having an inner diameter larger than the outer diameter of these opposite end portions. The opposite end portions of the pin 24 which protrude from the outer peripheral surface of the shock absorbing cylinder 7 are loosely inserted in circular holes 26, 26 formed in the first yoke 8.

In the case of the thus constructed elastic universal joint 6b, when the rotational torque applied to the steering shaft 2 is small, this rotational torque is transmitted from the steering shaft 2 to the first yoke 8 through the shock absorbing cylinder 7. Accordingly, as in the case of the structure of the above-described first example, the vibration transmitted to the first yoke 8 is absorbed by the elastic material 15 of the shock absorbing cylinder 7 and is not transmitted to the steering shaft 2. In contrast, when the rotational torque applied from the steering wheel to the steering shaft 2 is great, the outer peripheral surfaces of the opposite end portions of the pin 24 and the inner peripheral surfaces of the circular holes 26, 26 abut against one another. As a result, much of the rotational torque applied from the steering wheel to the steering shaft 2 is transmitted to the first yoke 8 through the pin 24.

The construction and action of the elastic universal joints 6a, 6b are as described above, and the first yoke 8 constituting such elastic universal joint 6a or 6b has heretofore been made by steps as shown in FIGS. 35A to 39B of the accompanying drawings. First, at the first step, a metallic plate which is a blank is subjected to stamping work to thereby make a first intermediate member 27 as shown in FIGS. 35A and 35B. This first intermediate member 27 comprises a long rectangular base portion 28 and a pair of tongue-like portions 29, 29 protruding from two locations on one side edge (the upper edge as viewed in FIG. 35A) of the base portion 28. At the next second step, the base portion 28 is rounded into a cylindrical shape to thereby make a cylindrical portion 30, and the tongue-like portions 29, 29 are curved in such a direction that their inner peripheral surfaces become concave surfaces, to thereby make a pair of arm portions 31, 31, thus providing a second intermediate member as shown in FIGS. 36A to 36C. At the next third step, the opposite end portions of the base portion 28 which abut against each other are welded together in a circumferential portion of the cylindrical portion 30 to thereby make a third intermediate member as shown in FIGS. 37A and 37B. Subsequently, at the fourth step, as shown in FIGS. 38A to 38C the opening end edge of the cylindrical portion 30 is subjected to chamfering work and the inner peripheral surface of this cylindrical portion 30 is subjected to cutting work by a lathe to thereby finish the dimension of the inner diameter of this cylindrical portion 30 accurately as per the design value, and the shock absorbing cylinder 7 (FIGS. 31, 32 and 34) is made capable of being internally fitted and fixed. In this state, the cylindrical portion 30 becomes a completed cylindrical portion 18. Further, at the fifth step, as shown in FIGS. 39A and 39B, circular holes 32, 32 coaxial with each other are formed in the tip end portions of the pair of arm portions 31, 31 to thereby make a first yoke 8. The bearing cups 34, 34 of radial needle bearings 33, 33 supporting the end portions of the cruciform shaft 10 can be fitted in and fixed to these circular holes 32, 32.

In the case of the prior-art method of manufacturing a yoke for an elastic universal joint, an increase in the manufacturing cost of the yoke for the elastic universal joint has been unavoidable. The reason for this is that as will be described below, the automation of each step is difficult or the steps requiring much working time are present and therefore it is impossible to make the manufacturing work efficient. That is, the third step of welding the opposite end portions of the base portion 28 which abut against each other and the fourth step of subjecting the inner peripheral surface of the cylindrical portion 30 to the cutting work by a lathe are difficult to automate and moreover require much working time. Therefore, these steps become a bottleneck and it has been difficult to make the work of manufacturing the yoke for the elastic universal joint efficient and the manufacturing cost of the yoke for the elastic universal joint and the elastic universal joint incorporating this yoke has run up. A method of manufacturing a yoke for an elastic universal joint according to the present invention has been invented in view of such circumstances.

SUMMARY OF THE INVENTION

A method of manufacturing a yoke for an elastic universal joint according to the present invention comprises in a preferred mode the first to eighth steps described in the following items (1) to (8):

(1) the first step of subjecting a metallic-plate blank to stamping work to thereby make a first intermediate member comprising a substantially disc-shaped base portion and a pair of tongue portions formed at opposite locations along a diameter of the base portion in a state protruding diametrally outwardly of the base portion;

(2) the second step of subjecting the first intermediate member to bending work to thereby curve the pair of tongue portions in a direction in which the cross-sectional shape thereof, in a direction perpendicular to the diameter of the base portion becomes arcuate, thus making a second intermediate member;

(3) the third step of subjecting the second intermediate member to deep drawing work to thereby make a third intermediate member comprising a bottomed cylinder portion formed from a portion of the second intermediate member which corresponds to the base portion, and a pair of arm portions substantially parallel to each other and each having a curved cross-sectional shape, the pair of arm portions being formed from the remainder of the second intermediate member which corresponds to the pair of tongue portions;

(4) the fourth step of subjecting the third intermediate member to ironing work for adjusting the thickness of a cylindrical portion of the bottomed cylinder portion of the third intermediate member, to thereby make a fourth intermediate member in which the plate thickness of a cylindrical portion is regulated to a predetermined value;

(5) the fifth step of removing a bottom portion of the bottomed cylinder portion of the fourth intermediate member to thereby make a fifth intermediate member comprising a cylinder portion, having a desired plate thickness, regulated to the predetermined value, a hole corresponding to the removed bottom portion and a pair of arm portions substantially parallel to each other and each having a curved cross-sectional shape;

(6) the sixth step of working a portion of the fifth intermediate member including, a periphery of the hole to thereby make a sixth intermediate member comprising a cylinder portion having a predetermined inner diameter, and a pair of arm portions substantially parallel to each other and each having a curved cross-sectional shape;

(7) the seventh step of subjecting the pair of arm portions of the sixth intermediate member to diameter-reducing work to thereby make a seventh intermediate member in which the diameter of circumscribed circles of the outer peripheral surfaces of a pair of arm portions of the seventh intermediate member is regulated to a predetermined value; and (8) the eighth step of forming circular holes coaxial with each other in the end portions of the pair of arm portions of the seventh intermediate member to thereby make a yoke for an elastic universal joint.

The method of manufacturing a yoke for an elastic universal joint according to the present invention constructed as described above comprises only the steps which are easy to automate and moreover require a short time. Therefore, the automation of the work of manufacturing the yoke for the elastic universal joint and the shortening of the working time can be achieved, and the cost of the yoke for the elastic universal joint and the elastic universal joint incorporating the yoke therein can be reduced.

BRIEF DESCRIPTION OF THE DRAWINGS

FIGS. 1A and 1B show a first intermediate member made by the first step in a first embodiment of the present invention, FIG. 1A being a plan view and FIG. 1B being a view seen from sideways of FIG. 1A.

FIGS. 4A and 4B show a state in which the third step is carried out, FIG. 4A being a cross-sectional view showing the started state, and FIG. 4B being a cross-sectional view showing the terminated state.

FIGS. 6A and 6B show a state in which the fourth step is carried out, FIG. 6A being a cross-sectional view showing the started state, and FIG. 6B being a cross-sectional view showing the terminated state.

FIGS. 9A and 9B show a state in which the fifth step is carried out, FIG. 9A being a cross-sectional view showing the started state, and FIG. 9B being a cross-sectional view showing the terminated state.

FIGS. 11A and 11B show a state in which the sixth step is carried out, FIG. 11A showing the started state, and FIG. 11B showing the terminated state.

FIGS. 13A and 13B show a state in which the seventh step is carried out, FIG. 13A being a cross-sectional view showing the started state, and FIG. 13B being a cross-sectional view showing the terminated state.

FIGS. 15A and 15B show a yoke for an elastic universal joint completed by way of the eighth step, with a cruciform shaft and a radial needle bearings, FIG. 15A being a cross-sectional view, and FIG. 15B being a view seen from sideways of FIG. 15A.

FIGS. 16A and 16B show a state in which the sixth step in a second embodiment of the present invention is carried out, FIG. 16A being a cross-sectional view showing the started state, and FIG. 16B being a cross-sectional view showing the terminated state.

FIGS. 18A and 18B show a state in which the seventh step in the second embodiment is carried out, FIG. 18A being a cross-sectional view showing the started state, and FIG. 18B being a cross-sectional view showing the terminated state.

FIGS. 27A and 27B show a yoke for an elastic universal joint completed by way of the eighth step after the fourth step in the fourth embodiment, FIG. 27A being a cross-sectional view, and FIG. 27B being a view seen from sideways of FIG. 27A.

FIGS. 28A and 28B show a first example of another shape of the yoke made by the method of the present invention, FIG. 28A being a cross-sectional view, and FIG. 28B being a view seen from sideways of FIG. 28A.

FIGS. 29A and 29B show a second example of another shape of the yoke made by the method of the present invention, FIG. 29A being a cross-sectional view, and FIG. 29B being a view seen from sideways of FIG. 29A.

FIGS. 36A to 36C show a second intermediate member made by the second step, FIG. 36A being a plan view, FIG. 36B being a cross-sectional view, and FIG. 36C being a view seen from sideways of FIGS. 36A and 36B.

FIGS. 37A and 37B shows a third intermediate member made by the third step, FIG. 37A being a plan view, and FIG. 37B being a front view.

FIGS. 39A and 39B show a yoke for an elastic universal joint completed by way of the fifth step, with a cruciform shaft and a radial needle bearing, FIG. 39A being a cross-sectional view, and FIG. 39B being a view seen from sideways of FIG. 39A.

DESCRIPTION OF THE PREFERRED EMBODIMENTS

Figure 2A:
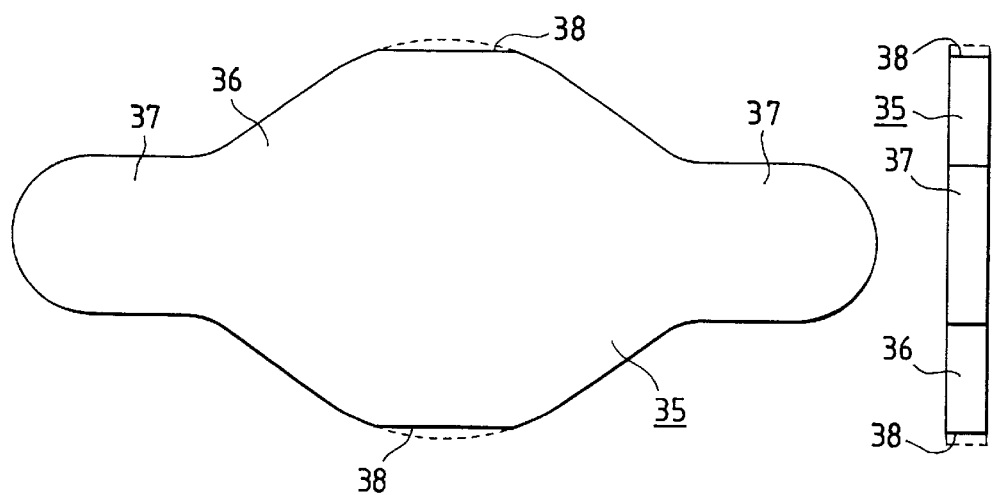
FIGS. 2A and 2B are views similar to FIGS. 1A and 1B, but showing another example of the shape of the first intermediate member.
Figure 2B:
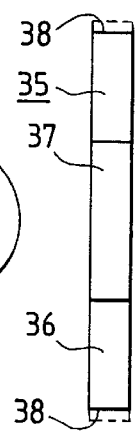

FIGS. 1A to 15B show a first embodiment of the present invention. As the first step, a metallic plate which is a blank is first subjected to stamping work to thereby make a first intermediate member 35 as shown in FIGS. 1A and 1B or FIGS. 2A and 2B. As the metallic plate, use is made of a steel plate or the like having a thickness dimension which can provide necessary rigidity. As this metallic plate, use can be made of a flat plate as well as a coil material pulled out of an uncoiler. The first intermediate member 35 made by the first step, as shown in FIGS. 1A or 2A, comprises a substantially disc-shaped base portion 36 and a pair of tongue-like portions 37, 37. This pair of tongue-like portions 37, 37 are formed at diametrally opposite locations on the base portion 36 in a state protruding diametrally outwardly of the base portion 36. The outer peripheral shape of the base portion 36 is basically circular, but need not always be circular. For example, as shown in FIG. 1A, it may be substantially elliptical, or as shown in FIG. 2A, it may assume a shape in which straight portions 38, 38 are formed by partly cutting away outer peripheral edge portions.

Figure 3A:
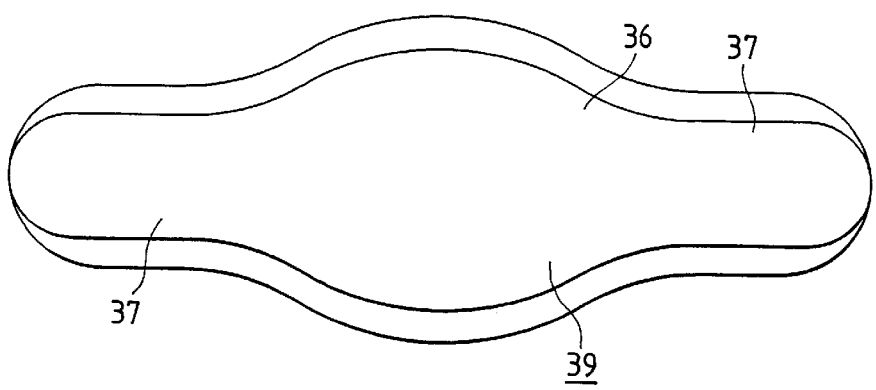
FIGS. 3A and 3B are views similar to FIGS. 1A and 1B, but showing a second intermediate member made by the second step.
Figure 3B:
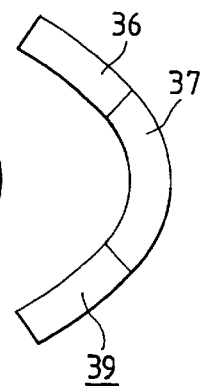

Subsequently, as the second step, the first intermediate member 35 is subjected to bending work. The bending work at this second step is done, for example, by strongly pressing the first intermediate member 35 between the lower surface of an upper mold and the upper surface of a lower mold, the upper and lower molds each having a curved shape, and this first intermediate member 35 is plastically deformed into a shape matching the two surfaces. By passing through such second step, the first intermediate member 35 becomes a second intermediate member 39. This second intermediate member 39, as shown in FIGS. 3A and 3B, is curved in a direction in which the cross-sectional shape thereof in a direction perpendicular to the direction of arrangement of the pair of tongue-like portions 37, 37 and the base portion 36 becomes arcuate. This second step is effected to curve the cross-sectional shapes of the tongue-like portions 37, 37 to improve the flexural rigidity (increase the cross-sectional coefficient) of the tongue-like portions 37, 37 which will be made into a pair of arm portions 40, 40 at the third step which will now be described. It is not important to curve the base portion 36.

Subsequently, as the third step, the second intermediate member 39 is subjected to deep drawing work as shown in FIGS. 4A and 4B. In this deep drawing work, the second intermediate member 39 is plastically deformed between the outer peripheral surface of a round rod-like drawing punch 41 and the inner peripheral surface of cylindrical drawing dies 42. A curved portion 43 of which the cross-sectional shape is a quarter arcuate convex surface is provided on the inner peripheral edge of the upper end opening portion of the drawing dies 42. Also, the inner peripheral surface of the drawing dies 42 comprises a lower half portion 44 having an inner diameter $R_{44}$ and an upper half portion 45 a little larger in diameter than the lower half portion 44 and continued thereto by an inclined stepped portion 46. The curved portion 43 smoothly continues from the upper end of the upper half portion 45. Also, the outer diameter $D_{41}$ of the drawing punch 41 is made sufficiently smaller than the inner diameter $R_{44}$ of the lower half portion 44. More specifically, when the thickness dimension of the second intermediate member 39 is defined as $T_{39}$, the difference between the outer diameter $D_{41}$ and the inner diameter $R_{44}$ is made equal to or slightly smaller than twice the thickness dimension $T_{39}$ ($R_{44} \leq D_{41} + 2T_{39}$). Further, a curved portion 47 of which the cross-sectional shape is also a quarter arcuate convex surface is provided on the outer peripheral edge of the lower end portion of the drawing punch 41.

Figure 5A:
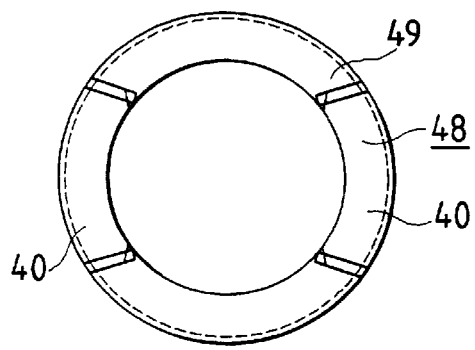
FIGS. 5A to 5C show a third intermediate member made by the third step, FIG. 5A being a plan view, FIG. 5B being a cross-sectional view, and FIG. 5C being a view seen from sideways of FIGS. 5A and 5B.
Figure 5B:
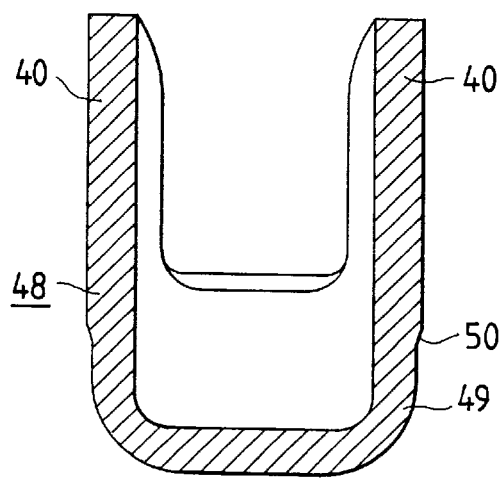
Figure 5C:
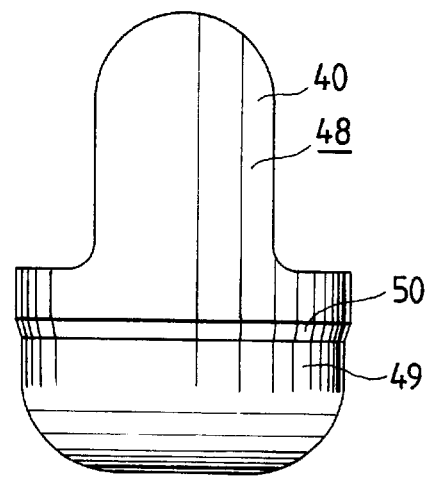

When the deep drawing work of the third step is to be carried out, the second intermediate member 39 is placed on the upper surface of the drawing dies 42 (having the shape and dimensions as described above, as shown in FIG. 4A). The upper end opening of the drawing dies 42 and a portion of the second intermediate member 39 which corresponds to the base portion 36 are then aligned with each other. From this state, the drawing punch 41 is lowered (or the drawing dies 42 are elevated) and as shown in FIG. 4B, this drawing punch 41 is inserted into the drawing dies 42. By this inserting work, a portion of the second intermediate member 39 which corresponds to the base portion 36 is forced into the inside portion of the lower half portion 44 and the tongue-like portions 37, 37 are pulled into the cylindrical gap portion between the inner peripheral surface of the drawing dies 42 and the outer peripheral surface of the drawing punch 41. As a result, the second intermediate member 39 is plastically deformed and made into a third intermediate member 48 as shown in FIGS. 5A to 5C. The obtained third intermediate member 48 is forced out of the drawing dies 42 by a knock-out pin, not shown. Accordingly, the automation of this third step can be easily accomplished like that of the first and second step.

The third intermediate member 48 comprises a bottomed cylinder portion 49 and a pair of arm portions 40, 40. The bottomed cylinder portion 49 is formed from that portion of the second intermediate member 39 which corresponds to the base portion 35, and the pair of arm portions 40, 40 are formed from the remainder of the second intermediate member 39 which corresponds to the pair of tongue-like portions 37, 37. An inclined stepped portion 50 corresponding to the inclined stepped portion 46 formed on the inner peripheral surface of the drawing dies 42 is formed on the intermediate portion of the outer peripheral surface of the bottomed cylinder portion 49. The arm portions 40, 40 are substantially parallel to each other and their cross-sectional shapes are curved.

Subsequently, as the fourth step, the third intermediate member 48 is subjected to ironing work, as shown in FIGS. 6A and 6B. In this ironing work, the third intermediate member 48 is ironed between the outer peripheral surface of a round rod-like ironing punch 52 and the inner peripheral surface of cylindrical ironing dies 53, whereby the third intermediate member 48 is plastically deformed. A curved portion 54 of which the cross-sectional shape is a quarter arcuate convex surface is provided on the inner peripheral edge of the upper end opening portion of the ironing dies 53. The inner peripheral surface of the ironing dies 53 comprises a lower half portion 55 having an inner diameter $R_{55}$ and an upper half portion 56 a little larger in diameter than the lower half portion 55, and continued to the lower half portion 55 by an inclined stepped portion 57. The curved portion 54 smoothly continues from the upper end of the upper half portion 56. Also, the inner diameter $R_{55}$ of the lower half portion 55 is a little smaller than the inner diameter $R_{44}$ of the lower half portion 44 of the drawing dies 42 (FIG. 4A) ($R_{55} < R_{44}$). The outer diameter $D_{52}$ of the ironing punch 52 is made sufficiently smaller than the inner diameter $R_{55}$ of the lower half portion 55. More specifically, when the thickness dimension of that portion of the third intermediate member 48 which is a portion of the peripheral wall (cylindrical wall) of the bottomed cylinder portion 49 is defined as $T_{49}$, the difference between the above-mentioned outer diameter $D_{52}$ and the above-mentioned inner diameter $R_{55}$ is made a little smaller than twice the thickness dimension $T_{49}$ ($R_{55} < D_{52} + 2T_{49}$). Further, a curved portion 58 of which the cross-sectional shape is also a quarter arcuate convex surface is provided on the outer peripheral edge of the lower end portion of the ironing punch 52. The radius of curvature of this curved portion 58 is sufficiently smaller than the radius of curvature of the curved portion 47 formed on the outer peripheral edge of the lower end portion of the drawing punch 41 (FIGS. 4A and 4B).

When the fourth step is to be carried out, the bottomed cylinder portion 49 formed on the lower end portion of the third intermediate member 48 is inserted into the ironing dies 53 having the shape and dimensions as described above. As shown in FIG. 6A, the ironing punch 52 is then inserted into the inside of the third intermediate member 48. From this state, the ironing punch 52 is lowered (or the ironing dies 53 are elevated) and as shown in FIG. 6B, the third intermediate member 48 is forced into the innermost part of the ironing dies 53. By this forcing-in work, in a portion of the third intermediate member 48, the bottomed cylinder portion 49 is forced into the inside portion of the lower half portion 55. As a result, the peripheral wall of this bottomed cylinder portion 49 is ironed and the thickness dimension $T_{49}'$ of this peripheral wall is regulated to ½ of the difference between the outer diameter $D_{52}$ of the ironing punch 52 and the inner diameter $R_{55}$ of the lower half portion 55 which is a desired value ($T_{49}' = (R_{55} - D_{52})/2$). At the same time, the outer peripheral edge portion of the bottom plate of the bottomed cylinder portion 49 is pushed by the curved portion 58 and the radius of curvature of the cross-sectional shape thereof becomes smaller. It is for the purpose of reducing the portion remaining as shear drop when the yoke for the elastic universal joint is made into a completed shape, and making the obtained shape more approximate to a cylinder that the radius of curvature of the cross-sectional shape of the outer peripheral edge portion of the bottom plate of the bottomed cylinder portion 49 is thus made smaller.

Figure 7C:
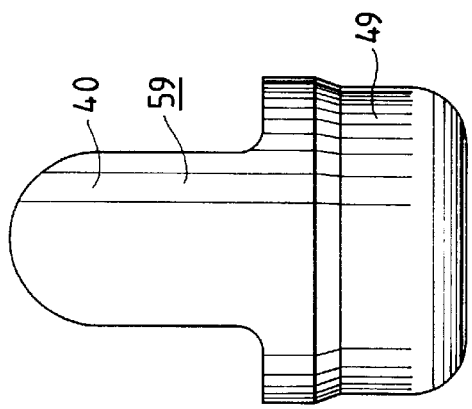
FIGS. 7A to 7C show a fourth intermediate member made by the fourth step, FIG. 7A being a plan view, FIG. 7B being a cross-sectional view, and FIG. 7C being a view seen from sideways of FIGS. 7A and 7B.
Figure 7A:
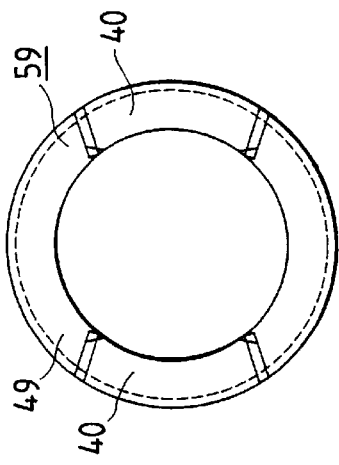
Figure 7B:
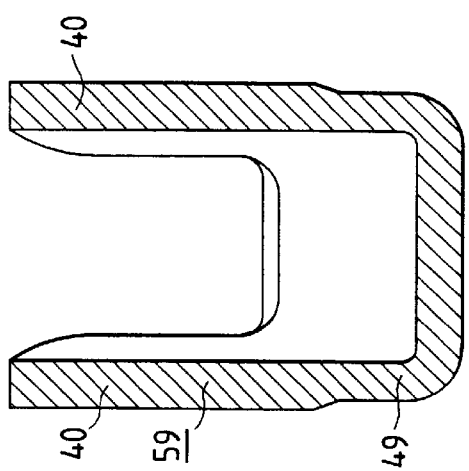

As a result of such ironing work at the fourth step, the bottomed cylinder portion 49 of the third intermediate member 48 is plastically deformed and made into a fourth intermediate member 59 as shown in FIGS. 7A to 7C. The basic shape of this fourth intermediate member 59 is similar to that of the third intermediate member 48. Particularly, in the case of this fourth intermediate member 59, as described above, the thickness dimension of the peripheral wall of the bottomed cylinder portion 49 is finished to a desired value and the radius of curvature of the cross-sectional shape of the outer peripheral edge portion of the bottom plate of the bottomed cylinder portion 49 is small. The obtained fourth intermediate member 59 is forced out of the ironing dies 53 by a knock-out pin, not shown. Accordingly, the automation of this fourth step can also be accomplished easily.

Figure 8:
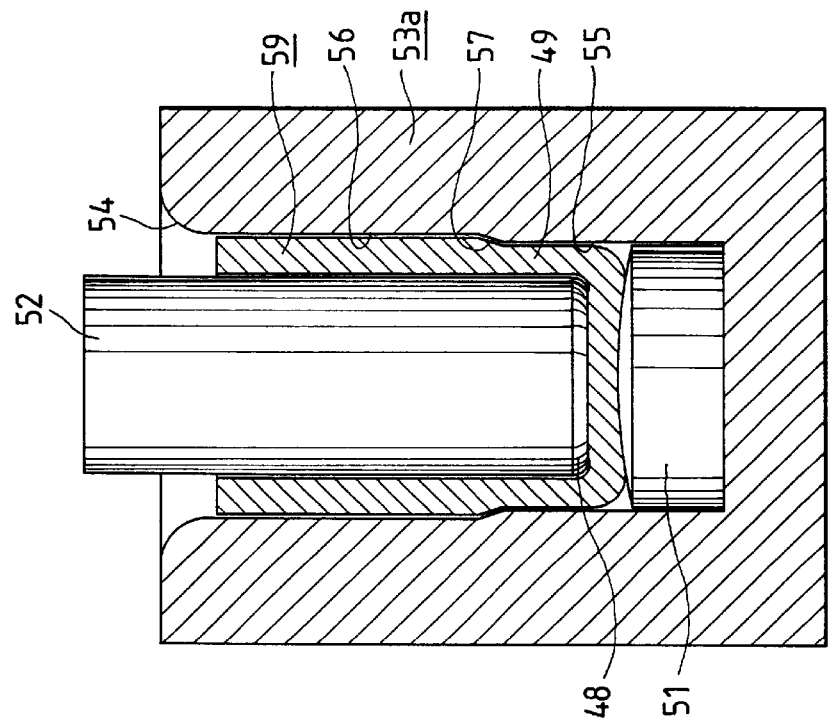
FIG. 8 is a view similar to FIG. 6B, but showing another example of the fourth step.

When the ironing work of this fourth step is to be carried out, if as shown in FIG. 8, a receiving punch 51 having its upper surface made into a spherical convex surface is provided on the bottom portion of bottomed cylindrical ironing dies 53a and the bottom plate portion of the bottomed cylinder portion 49 is sandwiched between the upper surface of the receiving punch 51 and the lower surface of an ironing punch 52, the radius of curvature of the cross-sectional shape of the outer peripheral edge portion of the bottom plate of the bottomed cylinder portion 49 can be made smaller to thereby improve the obtained shape more. When such a receiving punch 51 is used, the knock-out pin is made capable of being thrust up through the bottom portion of the ironing dies 53a and a through-hole (not shown) formed in the central portion of the receiving punch 51, whereby the automation of the step such as the removing work for the fourth intermediate member 59 can be easily achieved.

Figure 10A:
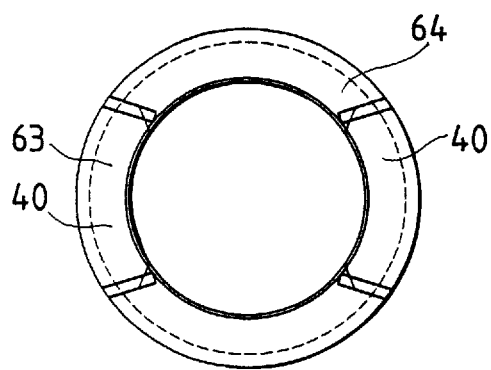
FIGS. 10A to 10C show a fifth intermediate member made by the fifth step, FIG. 10A being a plan view, FIG. 10B being a cross-sectional view, and FIG. 10C being a view seen from sideways of FIGS. 10A and 10B.
Figure 10B:
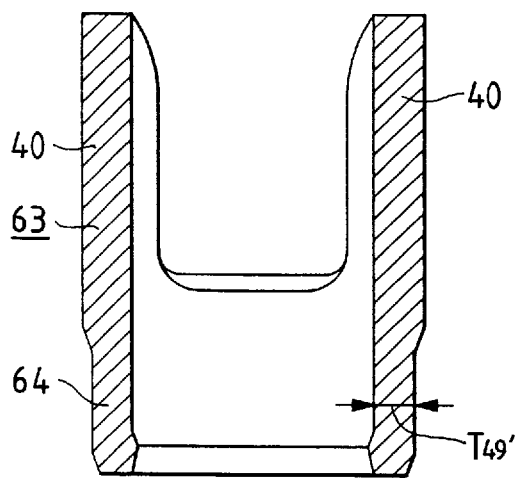
Figure 10C:
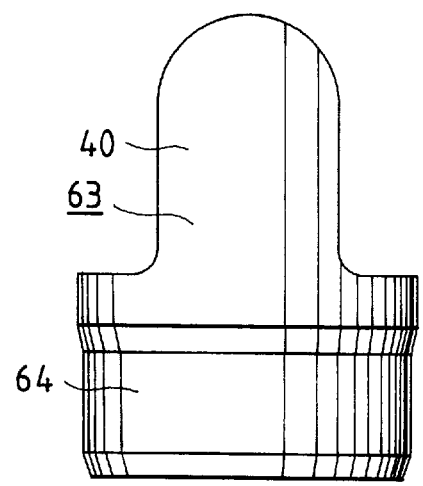

Subsequently, as the fifth step, a hole is formed in the bottom of the bottomed cylinder portion 49 of the fourth intermediate member 59 as shown in FIGS. 9A and 9B. This work is done by stamping the bottom of the bottomed cylinder portion 49 of the fourth intermediate member 59 to form a circular shape hole by a stamping punch 60 and stamping dies 61. An inwardly directed flange portion 62 is formed on the inner peripheral surface of the lower end portion of the stamping dies 61 made into a cylindrical shape, and the inner peripheral edge portion of the upper surface of this flange portion 62 and the outer peripheral edge portion of the lower surface of the stamping punch 60 are made into sharp corners. When the stamping work of the fifth step is to be carried out, the fourth intermediate member 59 is inserted into the stamping dies 61 as described above, and as shown in FIG. 9A, the stamping punch 60 is inserted into the inside of the fourth intermediate member 59 and is further pressurized. As a result, the bottom of the bottomed cylinder portion 49 is stamped to thereby make a fifth intermediate member 63 as shown in FIGS. 10A to 10C. This fifth intermediate member 63 comprises a cylinder portion 64 having a desired plate thickness ($T_{49}'=(R_{55}-D_{52})/2$), and a pair of arm portions 40, 40 substantially parallel to each other and each having a curved cross-sectional shape.

Figure 12A:
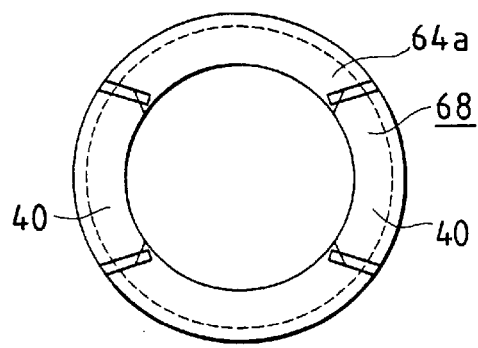
FIGS. 12A to 12C show a sixth intermediate member made by the sixth step, FIG. 12A being a plan view, FIG. 12B being a cross-sectional view, and FIG. 12C being a view seen from sideways of FIGS. 12A and 12B.
Figure 12B:
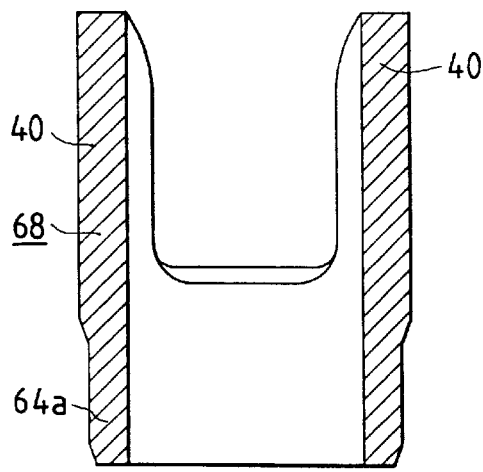
Figure 12C:
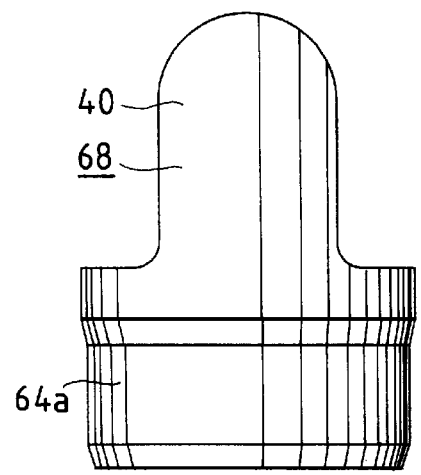

Subsequently, as the sixth step, the inner diameter finishing work of adjusting the inner diameter of the drilled portion worked into the fifth intermediate member 63 to a desired value is carried out as shown in FIGS. 11A and 11B. This inner diameter finishing work is done by an inner diameter finishing punch 65 and inner diameter finishing dies 66. An inwardly directed flange portion 67 is formed on the inner peripheral surface of the lower end portion of the inner diameter finishing dies 66 made into a cylindrical shape, and the fifth intermediate member 63 can be placed on the upper surface of this flange portion 67. When the inner diameter finishing work of the sixth step is to be carried out, the fifth intermediate member 63 is inserted into the inner diameter finishing dies 66 as described above, and as shown in FIG. 11A, the inner diameter finishing punch 65 is inserted into the inside of the fifth intermediate member 63. As a result, there is provided a sixth intermediate member 68 as shown in FIGS. 12A to 12C wherein the inner diameter of the cylinder portion 64 of the fifth intermediate member 63 has been regulated to a desired value over the full length thereof. This sixth intermediate member 68 comprises a cylinder portion 64a having its inner diameter regulated to a desired value over the full length thereof, and a pair of arm portions 40, 40 substantially parallel to each other and each having a curved cross-sectional shape.

Subsequently, as the seventh step, in such a manner as shown in FIGS. 13A and 13B, the cylinder portion 64a constituting the sixth intermediate member 68 is worked into a desired shape and the shaping work of reducing the diameter of the pair of arm portions 40, 40 is carried out. This shaping work is done by a shaping punch 69 and shaping dies 70. The outer peripheral surface of the shaping punch 69 is made into a shape corresponding to the shape of the inner peripheral surface of a seventh intermediate member 71 to be provided by this shaping work. That is, the outer peripheral surface of the shaping punch 69 comprises a lower end small-diametered portion 72 and an intermediate medium-diametered portion 73 continued to each other by a stepped portion 74 formed in a direction orthogonal to these portions 72 and 73. Also, a large-diametered portion 75 formed on the upper end portion of the shaping punch 69 and the above-mentioned medium-diametered portion 73 are continued to each other by a stepped portion 76 formed in a direction orthogonal to these portions 75 and 73 and an inclined stepped portion 77 provided on the inner diameter side of the stepped portion 76. On the other hand, on the inner peripheral surface of the shaping dies 70, there are formed a small-diametered portion 78 for urging the sixth intermediate member 68 against the outer peripheral surface of the shaping punch 69, and a pair of upper and lower inclined portions 79 and 80 continued from the upper and lower ends of the small-diametered portion 78 and having an inner diameter increasing from away this small-diametered portion 78.

When the shaping work of the seventh step is to be carried out, the cylinder portion 64a of the sixth intermediate member 68 is fitted on the medium-diametered portion 73 of the shaping punch 69 as described above. As shown in FIGS. 13A and 13B, the shaping punch 69 is lowered (or the shaping dies 70 are elevated) and the sixth intermediate member 68 is passed through the small-diametered portion 78 of the shaping dies 70. The inner diameter of this small-diametered portion 78 corresponds to the outer diameter of the seventh intermediate member 71 to be obtained. Accordingly, by passing through the small-diametered portion 78, the outer peripheral surface of the sixth intermediate member 68 is strongly pressed diametrally inwardly and made into a single cylindrical surface of which the diameter does not vary in the axial direction. At this time, the pair of arm portions 40, 40 are pushed diametrally inwardly, and the diameters of the circumscribed circles of the respective outer peripheral surfaces are regulated to a desired value (the outer peripheral surfaces of the arm portions 40, 40 and the outer peripheral surface of the cylinder portion 64a together constitute a single cylindrical surface). Also, the outer peripheral surface of the cylinder portion 64a is strongly pushed diametrally inwardly and as a result, this cylinder portion 64a is plastically deformed and becomes a cylinder portion 64b of which the outer peripheral surface is a single cylindrical surface and the inner peripheral surface coincides with the shape of the outer peripheral surface of the shaping punch 69. Also, a chamfered portion 82 is formed on that portion of the inner peripheral edge of the opening end of the cylinder portion 64b which is aligned with the inclined stepped portion 77 of the shaping punch 69. This chamfered portion 82 provides a guide when the shock absorbing cylinder 7 (FIGS. 31, 32, and 34) is fitted into and fixed to the cylinder portion 64b.

Figure 14A:
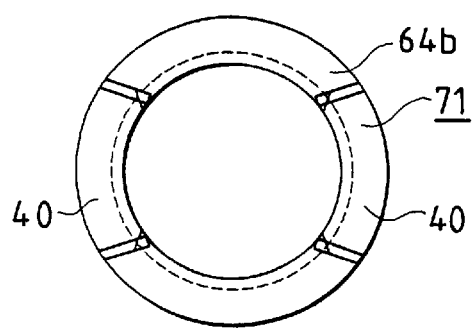
FIGS. 14A to 14C show a seventh intermediate member made by the seventh step, FIG. 14A being a plan view, FIG. 14B being a cross-sectional view and FIG. 14C being a view seen from sideways of FIGS. 14A and 14B.
Figure 14B:
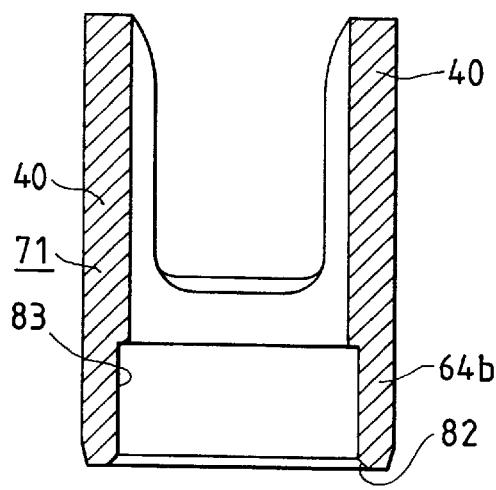
Figure 14C:
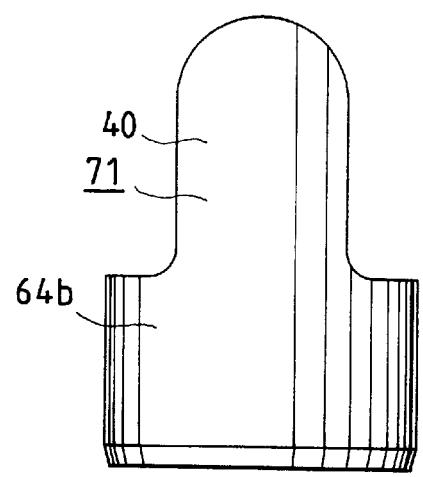

The sixth intermediate member 68 is thus subjected to the shaping work as described above, whereby there is obtained a seventh intermediate member 71 as shown in FIGS. 14A to 14C. This seventh intermediate member 71 comprises a cylinder portion 64b of which the outer diameter does not vary over the full length thereof and which has a large-diametered portion 83 enabling the shock absorbing cylinder 7 to be fitted thereinto and fixed thereto formed on the inner peripheral surface, and a pair of arm portions 40, 40 substantially parallel to each other and each having a curved cross-sectional shape.

Figure 31:
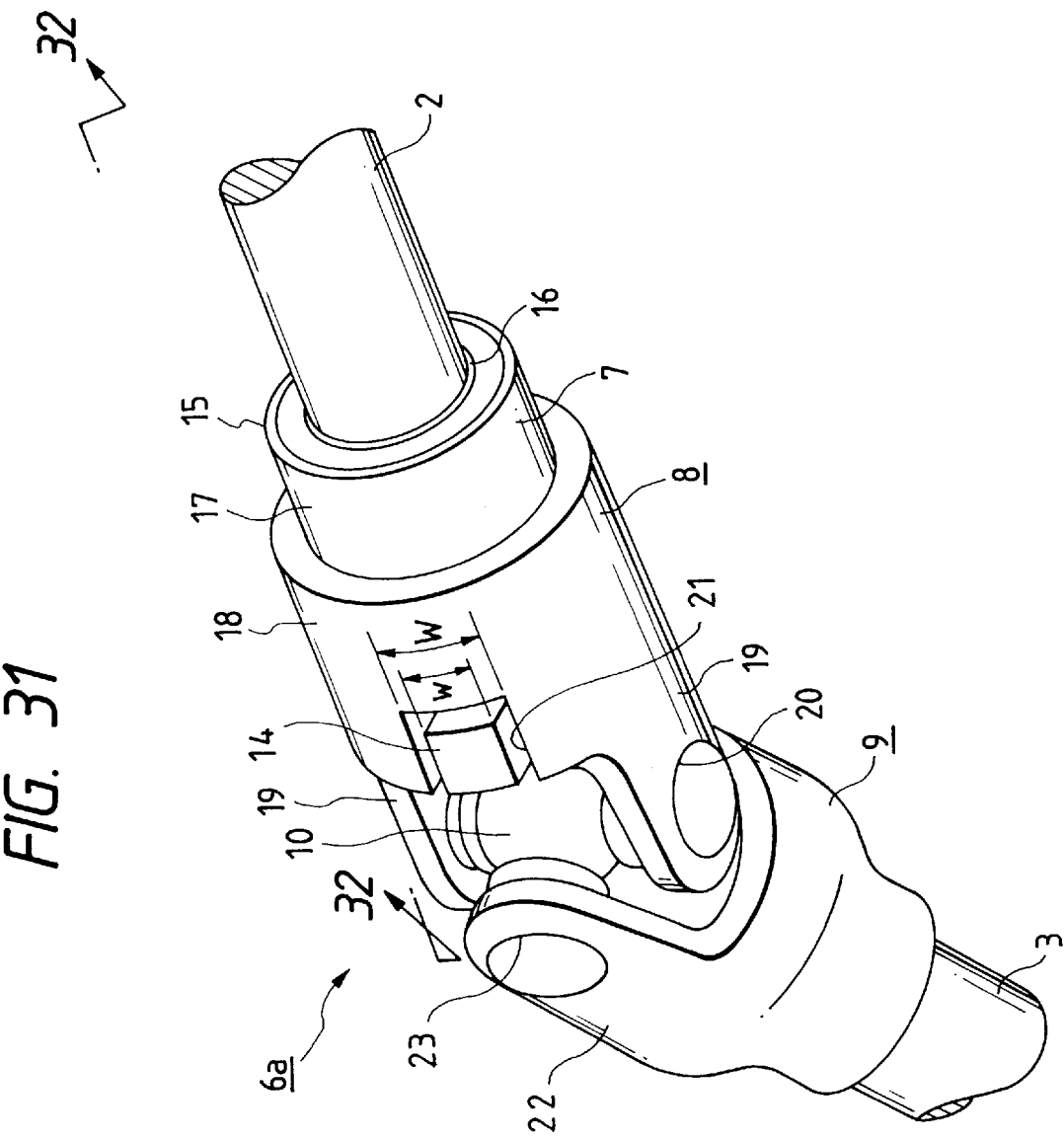
FIG. 31 is a perspective view showing a first example of an elastic universal joint according to the prior art.
Figure 32:
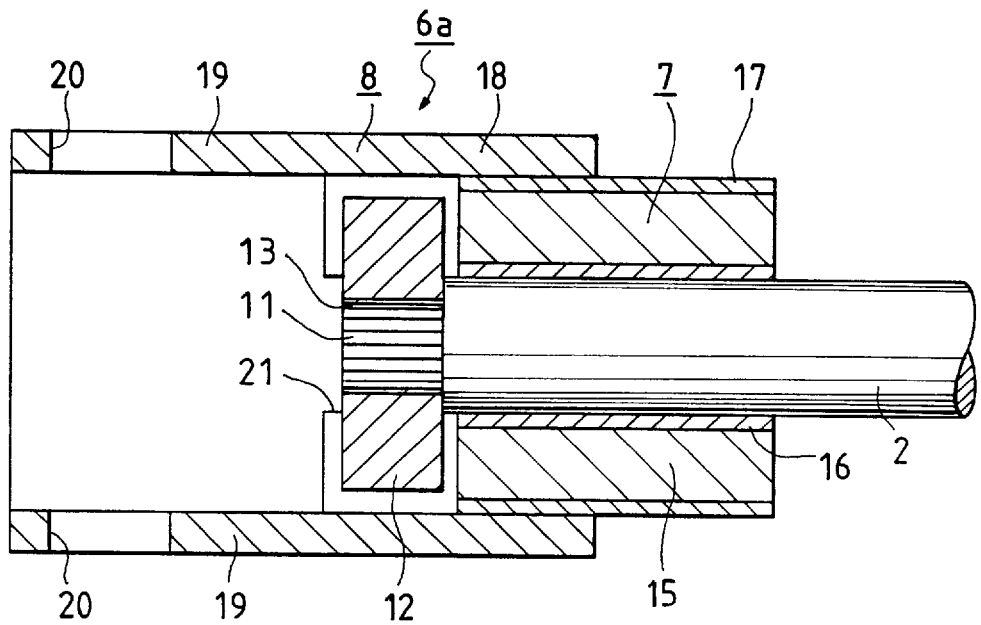
FIG. 32 is a cross-sectional view taken along the line 32—32 of FIG. 31 and showing the elastic universal joint with a cruciform shaft and a second yoke omitted.
Figure 33:
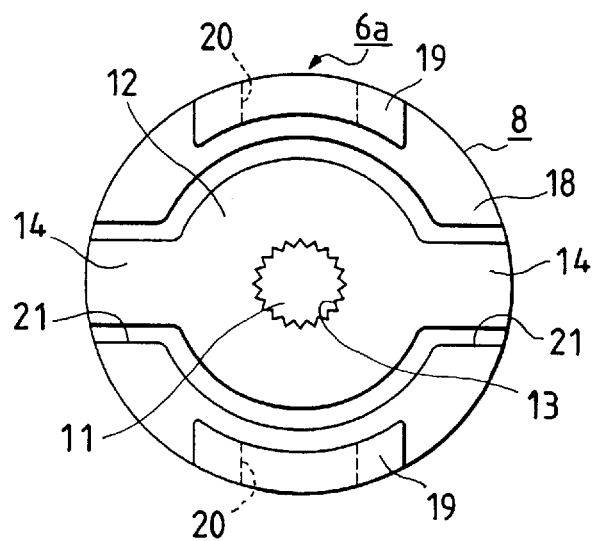
FIG. 33 is a view seen from the left of FIG. 32.
Figure 34:
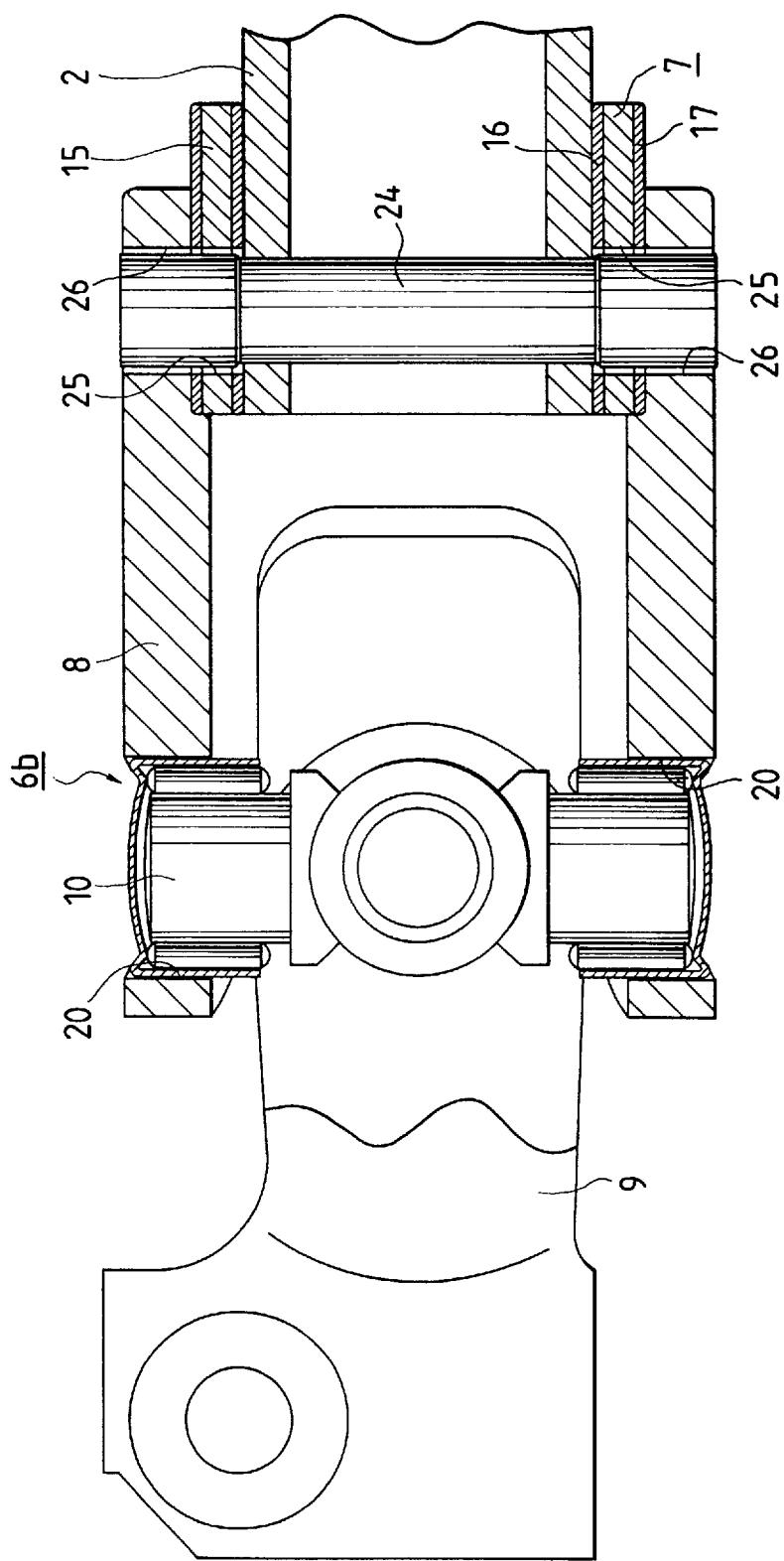
FIG. 34 is a cross-sectional view showing a second example of the elastic universal joint according to the prior art.
Figure 35A:
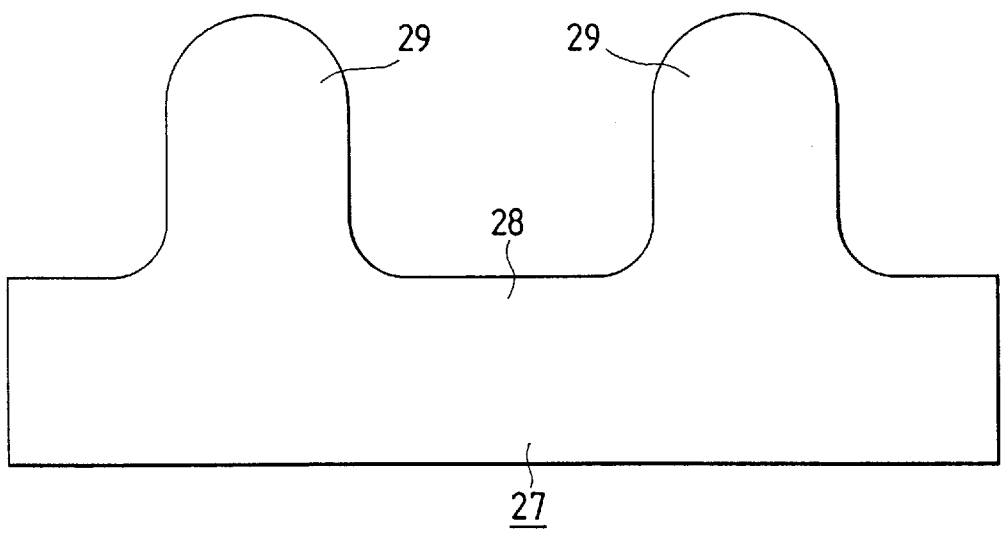
FIGS. 35A and 35B show a first intermediate member made by the first step in the method according to the prior art, FIG. 35A being a plan view, and FIG. 35B being a view seen from sideways of FIG. 35A.
Figure 35B:
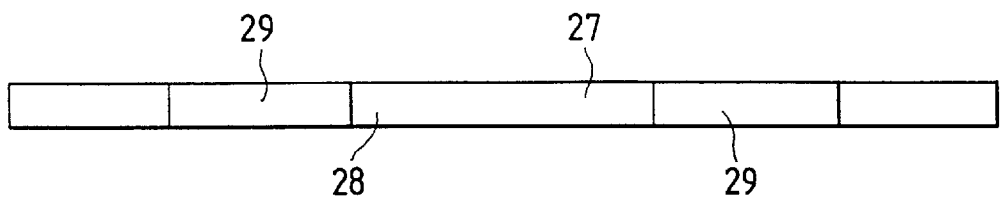
Figure 38A:
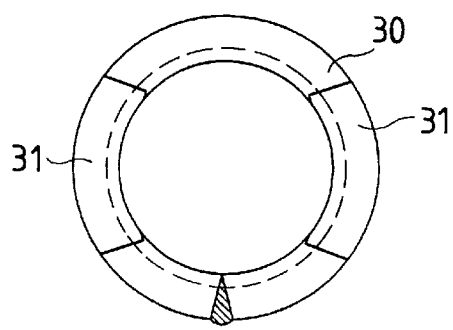
FIGS. 38A to 38C show a fourth intermediate member made by the fourth step, FIG. 38A being a plan view, FIG. 38B being a cross-sectional view, and FIG. 38C being a view seen from sideways of FIGS. 38A and 38B.
Figure 38B:
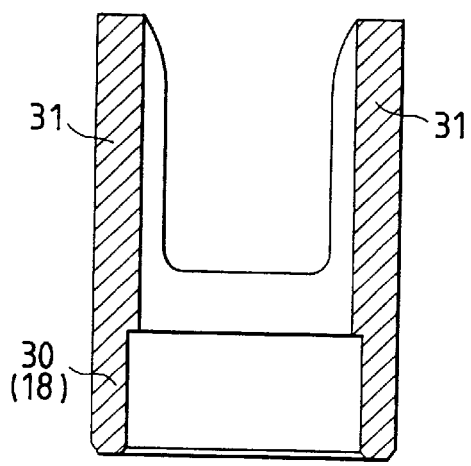
Figure 38C:
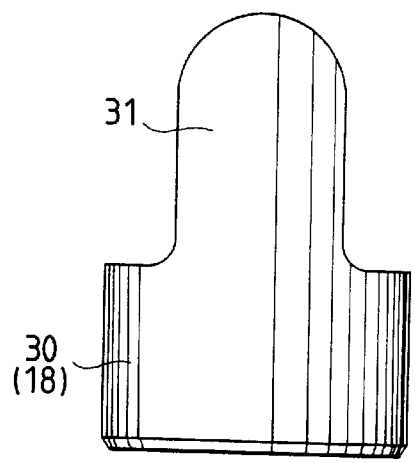

Lastly, as the eighth step, circular holes 32 and 32 coaxial with each other are formed in the tip end portions of the pair of arm portions 40, 40 of the seventh intermediate member 71 to thereby make a yoke 81 for an elastic universal joint as shown in FIGS. 15A and 15B. The drilling for forming these circular holes 32, 32 can be easily accomplished by stamping work using a press, or by a drilling machine. The stamping work has a merit of short working time, and the working by the drilling machine has the merit that the inner diameter can be accurately finished and post-working becomes unnecessary. Cut-aways 21, 21 as shown in FIGS. 31 to 33 or circular holes 26, 26 as shown in FIG. 34 are formed in the yoke 81 obtained in this manner, as required, to thereby couple a yoke for an elastic universal joint.

Bearing cups 34, 34 for radial needle bearings 33, 33 are fitted into and fixed to the circular holes 32, 32 in the yoke for an elastic universal joint completed in this manner. Two of four end portions of the cruciform shaft 10 are pivotally supported by these radial needle bearings 33, 33. Another yoke is pivotally supported on the remaining two end portions of the cruciform shaft 10 also through radial needle bearings. Further, the shock absorbing cylinder 7 is fitted into and fixed to the large-diametered portion 83 of the cylinder portion 64b, and a required transmission frame 12 (FIGS. 32 and 33) or a pin 24 (FIG. 34 ) is mounted thereon to thereby complete an elastic universal joint.

In order to confirm the realizability of the above-described first embodiment, the inventors carried out an experiment of shaping the yoke 81 under the following conditions.

Material: SPHE (JIS G 3131)

Plate thickness T (FIG. 1B): 6 mm

Diameter $D_{36}$ of the base portion of the first intermediate member 35 (FIG. 1A): 60 mm Full length $L_{35}$ of the first intermediate member 35 (FIG. 1A): 130 mm When under these conditions, the yoke 81 was shaped by the steps of the above-described first embodiment, there was obtained a yoke 81 in which the outer diameter of the arm portions 40, 40 was 41 mm, the inner diameter thereof was 29 mm, the inner diameter of the large-diametered portion 83 for fitting and fixing the shock absorbing cylinder 7 thereinto and thereto was 32 mm and the full height H (FIG. 15B) was 60 mm. Any defect such as cracks did not occur.

FIGS. 16A to 19C show a second embodiment of the present invention. In this embodiment, the sixth step (FIGS. 11A and 11B) and the seventh step (FIGS. 13A and 13B) of the above-described first embodiment are omitted. The first to fifth steps of this embodiment are similar to those of the above-described first embodiment. Instead of the sixth and seventh steps of the first embodiment, the new sixth and seventh steps are added. At the new sixth step, the cylinder portion 64 of the fifth intermediate member 63 as shown in FIGS. 10A and 10B made at the fifth step (FIGS. 9A and 9B) is pressed between a diameter enlarging punch 84 and diameter enlarging dies 85 as shown in FIGS. 16A and 16B. The diameter enlarging dies 85 are of a bottomed cylinder-like shape and provide a bore into which the fifth intermediate member 63 can be inserted. Also, the outer peripheral surface of the diameter enlarging punch 84 comprises a small-diametered portion 86 just insertable into the cylinder portion 64 of the fifth intermediate member 63 without any backlash and a medium-diametered portion 87 larger in diameter than the small-diametered portion 86 and continued thereto by an inclined stepped portion 88, and a large-diametered portion 89 continued to the medium-diametered portion 87 by an inclined stepped portion 90.

Figure 17A:
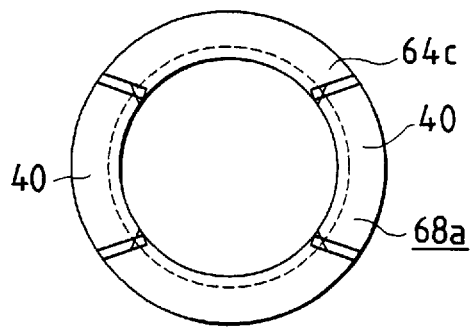
FIGS. 17A to 17C show a sixth intermediate member made by the sixth step, FIG. 17A being a plan view, FIG. 17B being a cross-sectional view, and FIG. 17C being a view seen from sideways of FIGS. 17A and 17B.
Figure 17B:
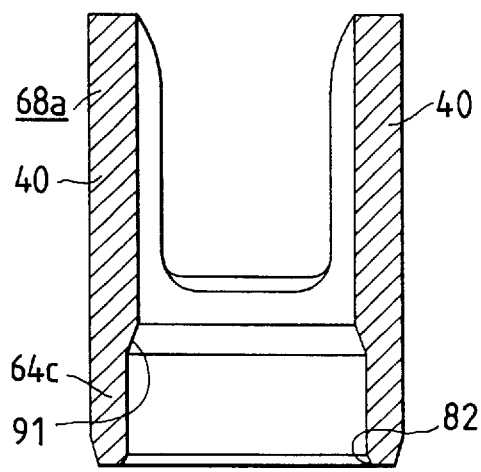
Figure 17C:
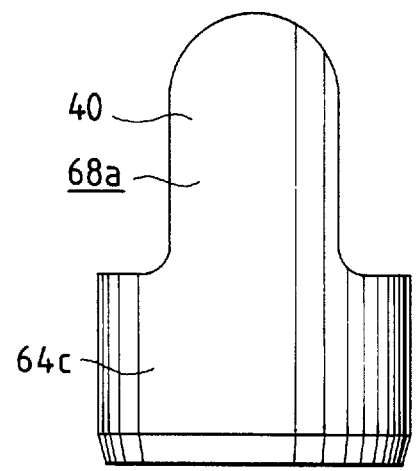

To enlarge the diameter of the cylinder portion 64 by the new sixth step by the use of the diameter enlarging punch 84 and the diameter enlarging dies 85 and make the inner diameter of this cylinder portion 64 into a desired value, the fifth intermediate member 63 is inserted into the diameter enlarging dies 85 with the arm portions 40, 40 downwardly directed, as shown in FIG. 16A. As shown in this figure, the small-diametered portion 86 of the diameter enlarging punch 84 is then inserted into the cylinder portion 64 and further, the diameter enlarging punch 84 is lowered (or the diameter enlarging dies 85 are elevated), and as shown in FIG. 16B, the medium-diametered portion 87 of the diameter enlarging punch 84 is pushed into the inside of the cylinder portion 64. As a result, the fifth intermediate member 63 becomes a sixth intermediate member 68a as shown in FIGS. 17A to 17C. This sixth intermediate member 68a comprises a cylinder portion 64c having its outer diameter regulated to a desired value over the full length thereof, and a pair of arm portions 40, 40 substantially parallel to each other and each having a curved cross-sectional shape. An inclined stepped portion 91 is formed on the inner peripheral surface of the intermediate portion of the cylinder portion 64c by the inclined stepped portion 88, and a chamfered portion 82 is formed on the inner peripheral edge of the opening end portion of the cylinder portion 64c by the inclined stepped portion 90.

Figure 19A:
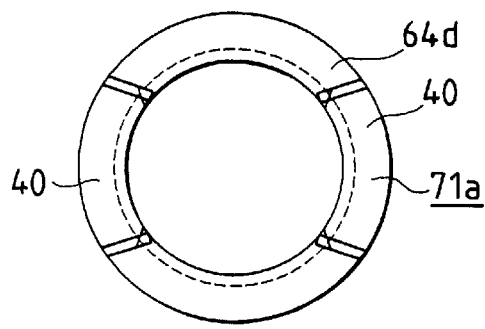
FIGS. 19A to 19C show a seventh intermediate member made by the seventh step, FIG. 19A being a plan view, FIG. 19B being a cross-sectional view, and FIG. 19C being a view seen from sideways of FIGS. 19A and 19B.
Figure 19B:
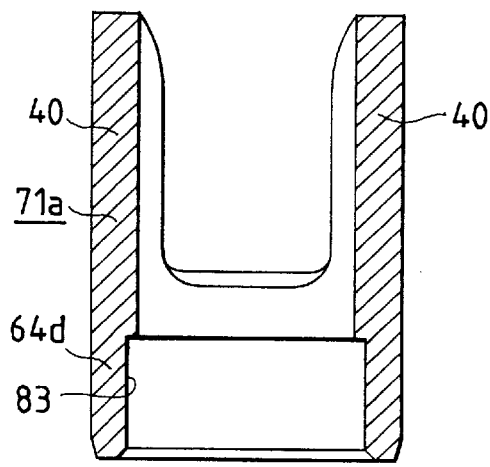
Figure 19C:
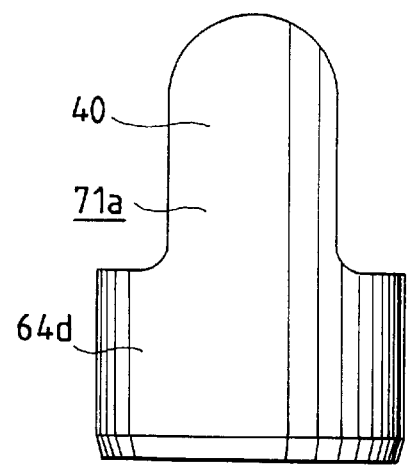

Subsequently, at the new seventh step, the sixth intermediate member 68a is subjected to shaping work by a shaping punch 92 and shaping dies 93 as shown in FIGS. 18A and 18B. The shaping dies 93 have a dimension and a shape similar to those of the diameter enlarging dies 85 used at the above-described new sixth step. Also, the shaping punch 92 has its portion corresponding to the inclined stepped portion 88 of the diameter enlarging punch 84 as a stepped portion 94 in a direction orthogonal to the center axis of this diameter enlarging punch 84. If with the sixth intermediate member 68a inserted in the shaping dies 93 as described above, the shaping punch 92 is inserted into this sixth intermediate member 68a, the inclined stepped portion 91 formed on the inner peripheral surface of the intermediate portion of the cylinder portion 64c will be pressed against the stepped portion 94 and become a stepped portion 95 in a direction orthogonal to the center axis of the cylinder portion 64c, and a seventh intermediate member 71a as shown in FIGS. 19A to 19C will be obtained. This seventh intermediate member 71a, like the seventh intermediate member 71 (FIGS. 14A to 14C) obtained by the afore-described first embodiment, comprises a cylinder portion 64d which does not vary in its outer diameter over the full length thereof and has a large-diametered portion 83 enabling the shock absorbing cylinder 7 to be fitted and fixed thereinto and thereto formed on the inner peripheral surface thereof, and a pair of arm portions 40, 40 substantially parallel to each other and each having a curved cross-sectional shape.

Lastly, as the eighth step, as in the aforedescribed first embodiment, circular holes 32, 32 coaxial with each other are formed in the tip end portions of the pair of arm portions 40, 40 of the seventh intermediate member 71a to thereby make a yoke 81 for an elastic universal joint as shown in FIGS. 15A and 15B.

Figure 20A:
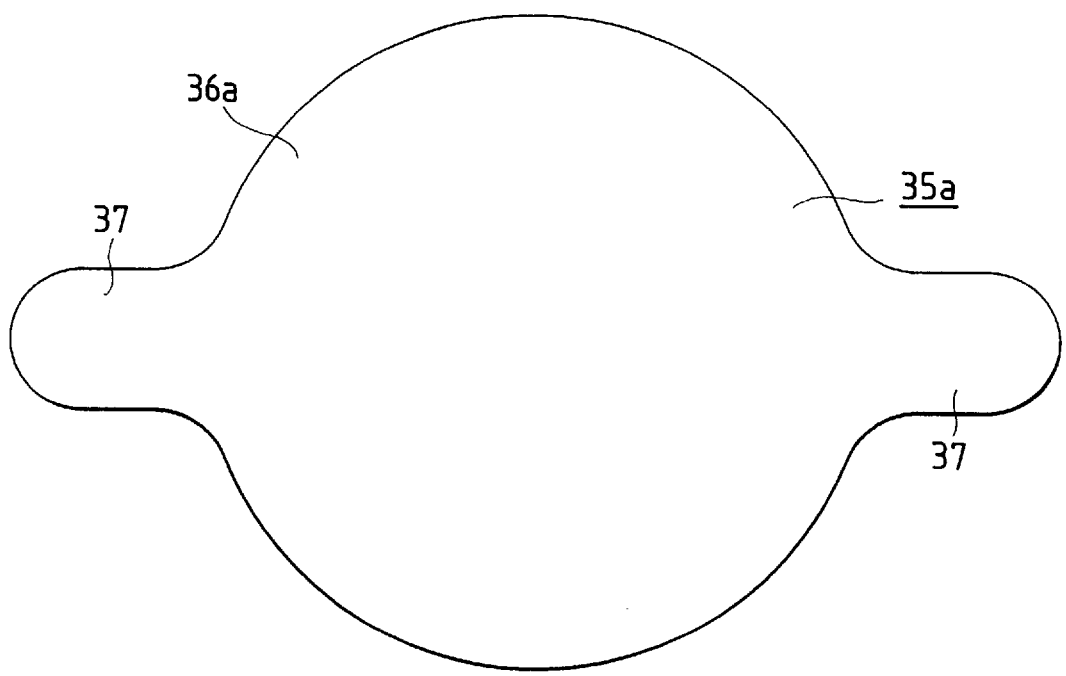
FIGS. 20A and 20B show a first intermediate member made by the first step in a third embodiment of the present invention, FIG. 20A being a plan view, and FIG. 20B being a view seen from below FIG. 20A.
Figure 20B:
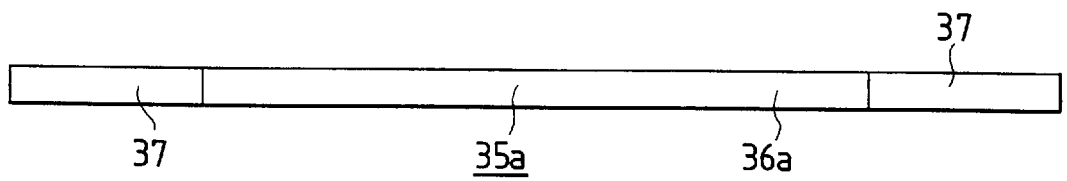

FIGS. 20A to 25B show a third embodiment of the present invention. This embodiment is one in which the present invention is applied to the manufacture of a yoke 97 for an elastic universal joint of the so-called high capacity type (FIGS. 25A and 25B) having a large-diametered cylinder portion 96 as shown in FIG. 25A so as to enable the large-diametered shock absorbing cylinder 7 (FIGS. 31, 32 and 34) to be incorporated thereinto to heighten the vibration attenuating ability. In this embodiment, at the first step, a first intermediate member 35a as shown in FIGS. 20A and 20B is first made. This first intermediate member 35a comprises a disc-like base portion 36a large in diameter as compared with that in the aforedescribed first embodiment, and a pair of tongue-like portions 37, 37 formed at the diametrally opposite locations of the base portion 36a in a state protruding diametrally outwardly of the base portion 36a.

Figure 21A:
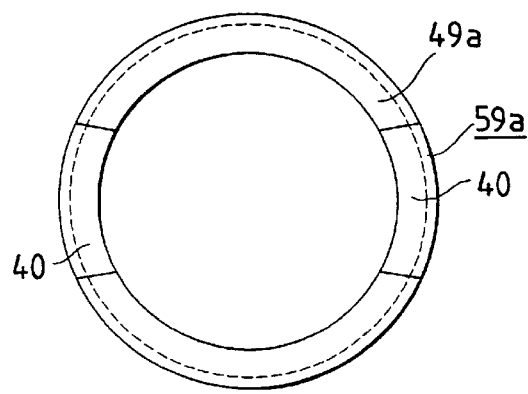
FIGS. 21A to 21C show a fourth intermediate member made by the fourth step in the third embodiment, FIG. 21A being a plan view, FIG. 21B being a cross-sectional view, and FIG. 21C being a view seen from sideways of FIGS. 21A and 21B.
Figure 21B:
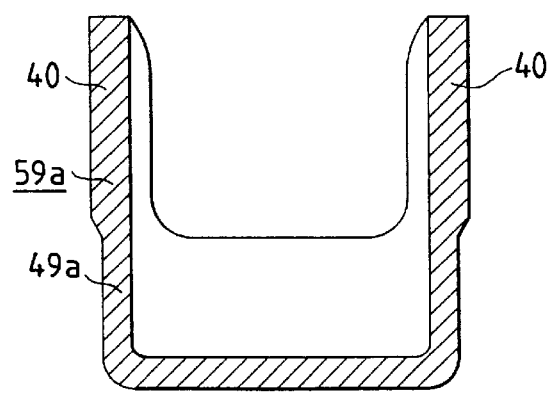
Figure 21C:
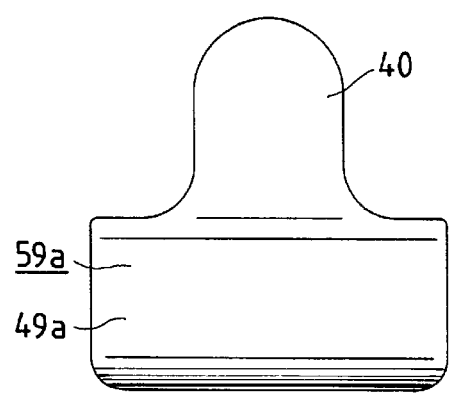
Figure 22A:
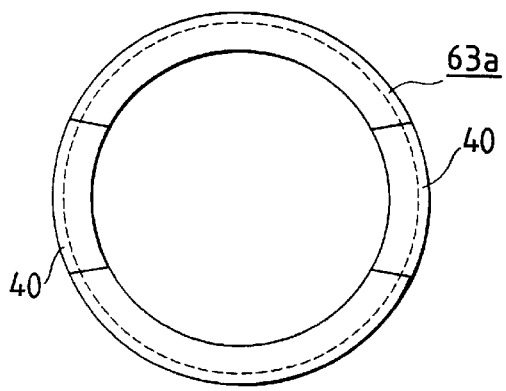
FIGS. 22A to 22C show a fifth intermediate member made by the fifth step in the third embodiment, FIG. 22A being a plan view, FIG. 22B being a cross-sectional view, and FIG. 22C being a view seen from sideways of FIGS. 22A and 22B.
Figure 22B:
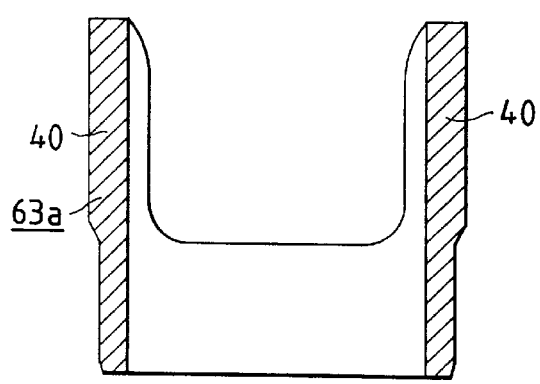
Figure 22C:
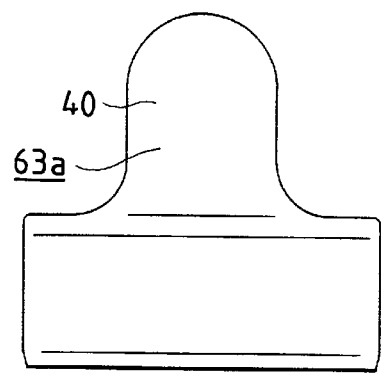
Figure 23A:
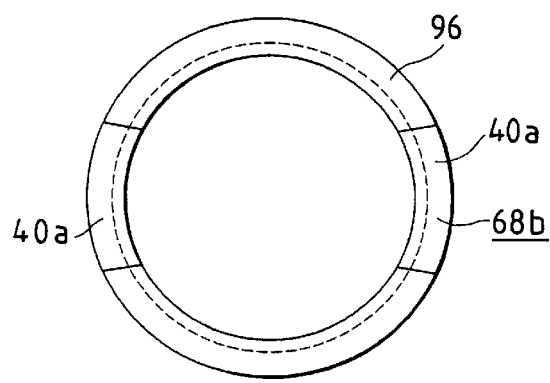
FIGS. 23A to 23C show a sixth intermediate member made by the sixth step in the third embodiment, FIG. 23A being a plan view, FIG. 23B being a cross-sectional view, and FIG. 23C being a view seen from sideways of FIGS. 23A and 23B.
Figure 23B:
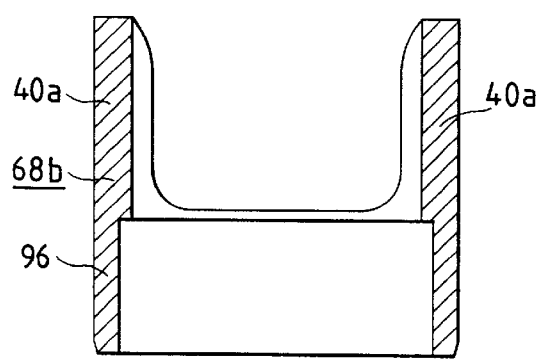
Figure 23C:
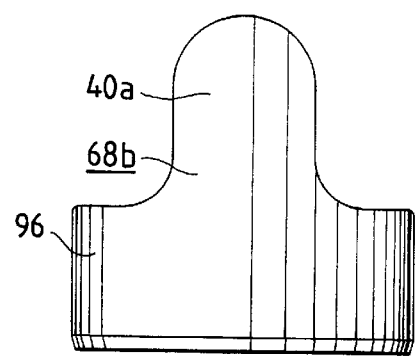

At the second step, the first intermediate member 35a is subjected to bending work to thereby make a second intermediate member (not shown), and at the third step, this second intermediate member is subjected to deep drawing work to thereby make a third intermediate member (not shown). Subsequently, at the fourth step, this third intermediate member is subjected to ironing work to thereby make a fourth intermediate member 59*a* having a bottomed cylinder portion 49*a* as shown in FIGS. 21A to 21C. By the work at the next fifth step, a hole is formed at the bottom of the bottomed cylinder portion 49*a* of the fourth intermediate member 59*a* to thereby make a fifth intermediate member 63*a* as shown in FIGS. 22A to 22C. At the next sixth step, the inner diameter of the fifth intermediate member 63*a* is adjusted to thereby make a sixth intermediate member 68*b* comprising, as shown in FIGS. 23A to 23C, a cylinder portion 96 having a desired inner diameter, and a pair of arm portions 40*a*, 40*a* substantially parallel to each other and each having a curved cross-sectional shape.

Figure 24A:
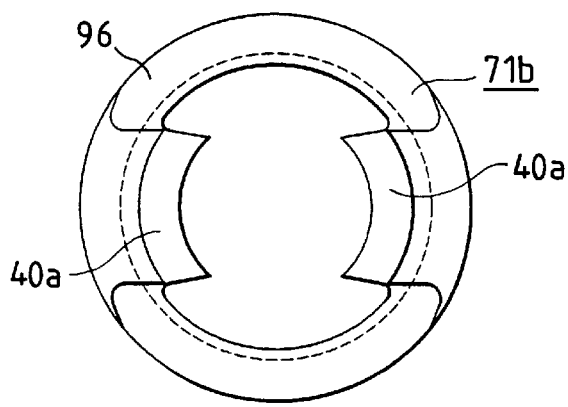
FIGS. 24A to 24C show a seventh intermediate member made by the seventh step in the third embodiment, FIG. 24A being a plan view, FIG. 24B being a cross-sectional view, and FIG. 24C being a view seen from sideways of FIGS. 24A and 24B.
Figure 24B:
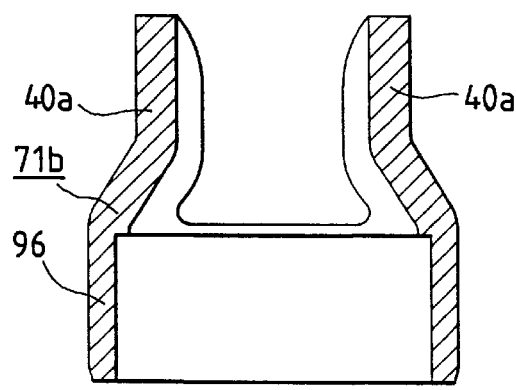
Figure 24C:
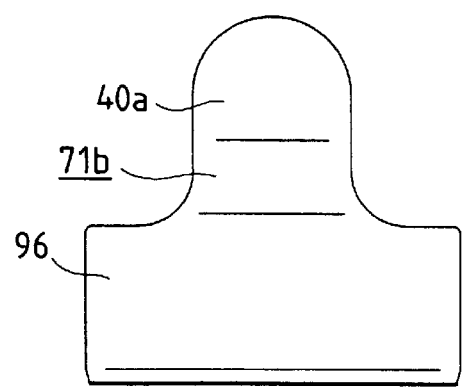
Figure 25A:
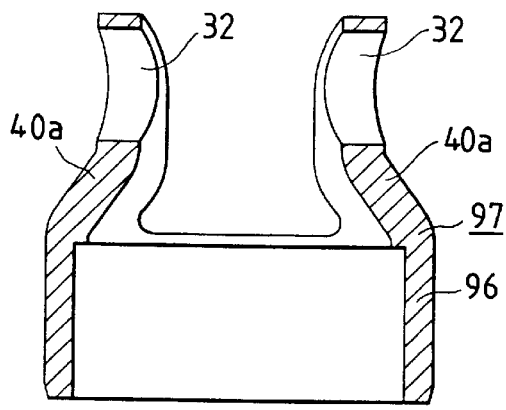
FIGS. 25A and 25B show a yoke for an elastic universal joint completed by way of the eighth step in the third embodiment, FIG. 25A being a cross-sectional view, and FIG. 25B being a view seen from sideways of FIG. 25A.
Figure 25B:
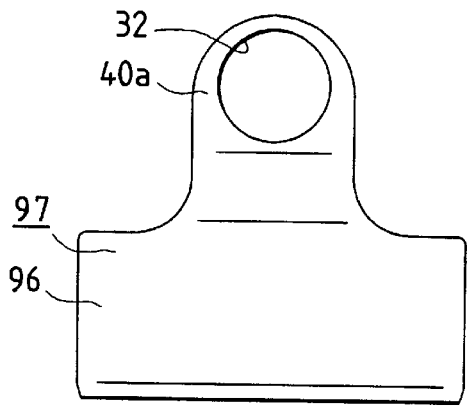

At the next seventh step, the pair of arm portions 40*a*, 40*a* are subjected to diameter-shrinking work in a direction in which the base half portions thereof are inclined with the tip half portions thereof kept parallel to each other. Thus, as shown in FIGS. 24A to 24C, there is made a seventh intermediate member 71*b* in which the diameters of the circumscribed circles of the outer peripheral surfaces of the tip half portions of the pair of arm portions 40*a*, 40*a* are regulated to a desired value. As the eighth step, circular holes 32, 32 coaxial with each other are formed in the tip end portions of the pair of arm portions 40*a*, 40*a* of the seventh intermediate member 71*b* to thereby make a yoke 97 for an elastic universal joint of the high capacity type as shown in FIGS. 25A and 25B. According to the method of manufacturing a yoke for an elastic universal joint in accordance with the present invention, such a yoke 97 for an elastic universal joint of the high capacity type can also be made easily by facilities similar to those of the aforedescribed first embodiment.

Figure 26A:
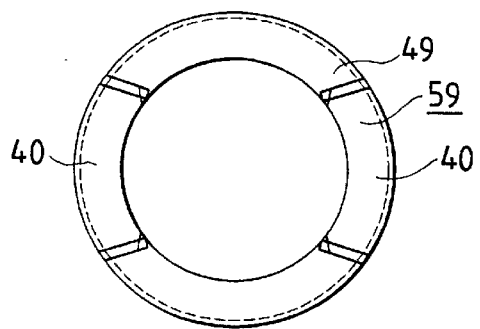
FIGS. 26A to 26C show a fourth intermediate member made by the fourth step in a fourth embodiment of the present invention, FIG. 26A being a plan view, FIG. 26B being a cross-sectional view, and FIG. 26C being a view seen from sideways of FIGS. 26A and 26B.
Figure 26B:
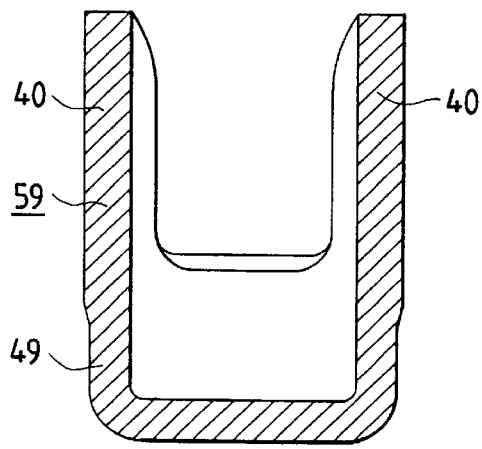
Figure 26C:
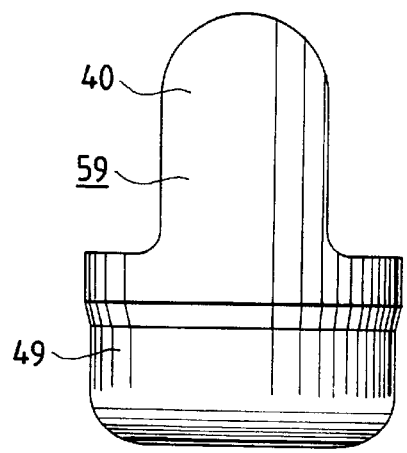
Figure 30:
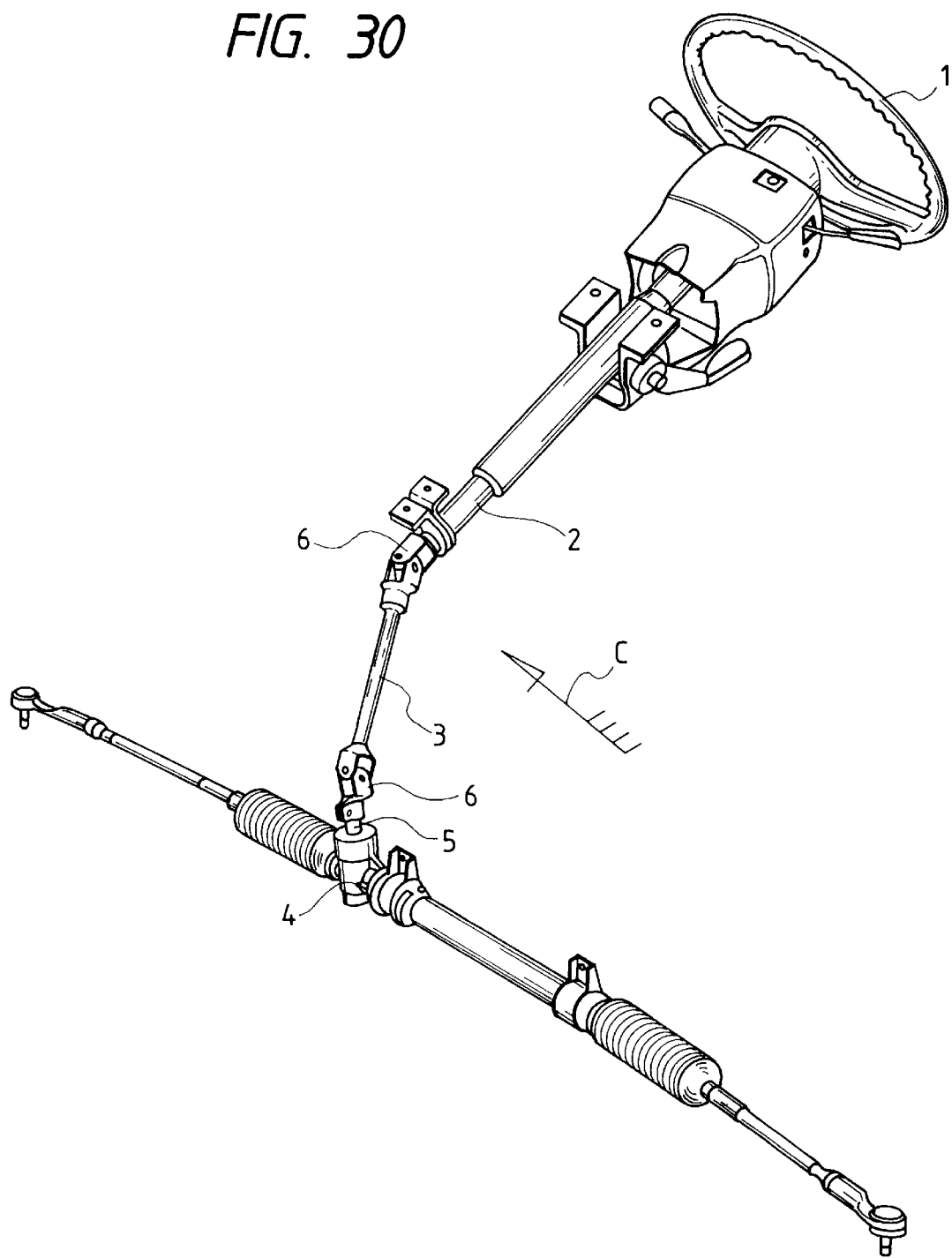
FIG. 30 is a perspective view showing an example of a steering apparatus incorporating an elastic universal joint therein.

FIGS. 26A to 27B show a fourth embodiment of the present invention. In this embodiment, circular holes 32, 32 are first formed in the tip end portions of the arm portions 40, 40 of a fourth intermediate member 59 as shown in FIG. 26A made by way of the first to fourth steps of the aforedescribed first embodiment to thereby make a yoke 99 as shown in FIGS. 27A and 27B. The fifth to seventh steps in the first embodiment are omitted. The outer diameter of a cylindrical surface portion 100 formed on a bottomed cylinder portion 49 provided on the base end portion of the yoke 99 is finished accurately as per a desired value, and the shock absorbing cylinder 7 (FIGS. 31, 32 and 34) can be fitted onto and fixed to this cylindrical surface portion 100. A shaft to which the yoke 99 is coupled through this shock absorbing cylinder 7 has at least its tip end portion made into a cylinder portion into and to which this shock absorbing cylinder 7 can be fitted and fixed.

FIGS. 28A to 29B show two other examples of the shape of the yoke made by the method of manufacturing a yoke for an elastic universal joint according to the present invention. The first example of the shape shown in FIGS. 28A and 28B is another example of the shape of the yoke made by the first embodiment or the second embodiment. In the case of this first example, stepped portions 101, 102 are formed at two locations on the inner peripheral surface of a cylinder portion 64*e*. Such stepped portions 101, 102 can be easily shaped by changing the shape of the outer peripheral surface of the shaping punch used at the seventh step. Also, the second example of the shape shown in FIGS. 29A and 29B is another example of the shape of the yoke made by the above-described fourth embodiment. In the case of this second example, stepped portions 103, 104 are formed at two locations on the outer peripheral surface of a bottomed cylinder portion 49*a*. Such stepped portions 103, 104 can be easily formed by changing the shape of the inner peripheral surface of the ironing dies used at the fourth step. According to the method of manufacturing a yoke for an elastic universal joint in accordance with the present invention, such changes of the shapes can be easily accomplished by a simple design change such as the change of the shape of a working metal mold.

What is claimed is:

1. A method of manufacturing a yoke for an elastic universal joint, comprising:
    (1) subjecting a metallic-plate blank to stamping work to thereby make a first intermediate member comprising a substantially disc-shaped base portion and a pair of tongue portions formed at opposite locations along a diameter of said base portion in a state protruding diametrally outwardly of said base portion;
    (2) subjecting said first intermediate member to bending work to thereby curve said pair of tongue portions in a direction in which the cross-sectional shape thereof, in a direction perpendicular to said diameter of said base portion, becomes arcuate, thus making a second intermediate member;
    (3) subjecting said second intermediate member to deep drawing work to thereby make a third intermediate member comprising a bottomed cylinder portion formed from a portion of said second intermediate member which corresponds to said base portion, and a pair of arm portions substantially parallel to each other and each having a curved cross-sectional shape, said pair of arm portions being formed from the remainder of said second intermediate member which corresponds to said pair of tongue portions;
    (4) subjecting said third intermediate member to ironing work for adjusting the thickness of a cylindrical portion of said bottomed cylinder portion of said third intermediate member, to thereby make a fourth intermediate member in which the plate thickness of said cylindrical portion is regulated to a predetermined value;
    (5) removing a bottom portion of the bottomed cylinder portion of said fourth intermediate member to thereby make a fifth intermediate member comprising a cylinder portion, having a plate thickness regulated to said predetermined value, a hole corresponding to the removed bottom portion, and a pair of arm portions substantially parallel to each other and each having a curved cross-sectional shape;
    (6) working a portion of said fifth intermediate member, including a periphery of said hole, to thereby make a sixth intermediate member comprising a cylinder portion having a predetermined inner diameter, and a pair of arm portions substantially parallel to each other and each having a curved cross-sectional shape;
    (7) subjecting said pair of arm portions of said sixth intermediate member to diameter-reducing work to thereby make a seventh intermediate member in which the diameter of circumscribed circles of the outer peripheral surfaces of a pair of arm portions of said seventh intermediate member is regulated to a predetermined value; and
    (8) forming circular holes coaxial with each other in tip end portions of the pair of arm portions of said seventh intermediate member to thereby make a yoke for an elastic universal joint.

2. A method of manufacturing according to claim 1, wherein said base portion is a solid shape.

3. A method of manufacturing according to claim 2, wherein said first intermediate member has a uniform thickness.

4. A method of manufacturing according to claim 1, wherein said first intermediate member has a uniform thickness.

5. A method of manufacturing a yoke for an elastic universal joint, comprising:

(1) subjecting a metallic-plate blank to stamping work to thereby make a first intermediate member comprising a substantially disc-shaped base portion and a pair of tongue portions formed at opposite locations along a diameter of said base portion in a state protruding diametrally outwardly of said base portion;

(2) subjecting said first intermediate member to bending work to thereby curve said pair of tongue portions in a direction in which the cross-sectional shape thereof, in a direction perpendicular to said diameter of said base portion, becomes arcuate, thus making a second intermediate member;

(3) subjecting said second intermediate member to deep drawing work to thereby make a third intermediate member comprising a bottomed cylinder portion formed from a portion of said second intermediate member which corresponds to said base portion, and a pair of arm portions substantially parallel to each other and each having a curved cross-sectional shape, said pair of arm portions being formed from the remainder of said second intermediate member which corresponds to said pair of tongue portions;

(4) subjecting said third intermediate member to ironing work for adjusting the thickness of a cylinder portion of said bottomed cylinder portion of said third intermediate member, to thereby make a fourth intermediate member in which the plate thickness of said cylindrical portion is regulated to a predetermined value; and (5) processing said fourth intermediate member to form said yoke for an elastic universal joint.

6. A method of manufacturing a yoke for an elastic universal joint according to claim 4, wherein said processing said fourth intermediate member includes removing a bottom portion of the bottomed cylinder portion of said fourth intermediate member to thereby make a fifth intermediate member comprising a cylinder portion, having a plate thickness regulated to said predetermined value, a hole corresponding to the removed bottom portion, and a pair of arm portions substantially parallel to each other and each having a curved cross-sectional shape, enlarging the diameter of the cylinder portion of said fifth intermediate member to thereby make the inner diameter of a cylinder portion of a sixth intermediate member into a predetermined value; and working the inner peripheral surface of said cylinder portion of said sixth intermediate member into a predetermined shape.

7. A method of manufacturing according to claim 5, wherein said base portion is a solid shape.

8. A method of manufacturing according to claim 7, wherein said first intermediate member has a uniform thickness.

9. A method of manufacturing according to claim 5, wherein said first intermediate member has a uniform thickness.

* * * * *